United States Patent [19]
Christensen

[11] Patent Number: 6,035,280
[45] Date of Patent: *Mar. 7, 2000

[54] ELECTRONIC DISCOUNT COUPONING METHOD AND APPARATUS FOR GENERATING AN ELECTRONIC LIST OF COUPONS

[76] Inventor: Scott N. Christensen, 15606 Holmes Cir., Omaha, Nebr. 68135

[*] Notice: This patent is subject to a terminal disclaimer.

[21] Appl. No.: 08/630,330

[22] Filed: Apr. 10, 1996

Related U.S. Application Data

[63] Continuation-in-part of application No. 08/491,367, Jun. 16, 1995, Pat. No. 5,710,886.
[51] Int. Cl.$^7$ .......................... G06F 151/00; G06F 15/21; G06F 15/22; G06F 15/24
[52] U.S. Cl. ................................... 705/14; 705/10; 705/1; 364/401; 364/402; 364/479; 186/52; 235/383
[58] Field of Search ................................ 705/14; 186/52; 235/383; 364/401, 402, 479

[56] References Cited

U.S. PATENT DOCUMENTS

| | | | |
|---|---|---|---|
| Re. 34,915 | 4/1995 | Nichtberger et al. | 705/14 |
| 4,554,446 | 11/1985 | Murphy et al. | 235/385 X |
| 4,674,041 | 6/1987 | Lemon et al. | 705/14 |
| 4,723,212 | 2/1988 | Mindrum et al. | 705/14 |
| 4,908,761 | 3/1990 | Tai | 705/14 |
| 5,128,752 | 7/1992 | Von Kohorn | 705/10 |
| 5,305,195 | 4/1994 | Murphy | 705/1 |
| 5,305,197 | 4/1994 | Axler et al. | 705/14 |
| 5,353,218 | 10/1994 | De Lapa et al. | 705/14 |
| 5,368,129 | 11/1994 | Von Kohorn | 705/14 X |
| 5,502,636 | 3/1996 | Clarke | 705/14 X |
| 5,710,886 | 1/1998 | Christensen et al. | 705/14 |

*Primary Examiner*—Allen R. MacDonald
*Assistant Examiner*—Pedro R. Kanof
*Attorney, Agent, or Firm*—Robert Platt Bell & Associates, P.C.

[57] ABSTRACT

A method and apparatus for distributing, generating, and redeeming discount Virtual Coupons™, rebate or gift certificates or the like which may be used on conjunction with a frequency card program or the like. Virtual Coupons™ may be distributed electronically, for example, in the form of a diskette or CD-ROM software. Software on the diskette or CD-ROM may prompt a consumer to call a 1-800 number for a validation number or code. During the phone call, telemarketing personnel may request consumer demographic and or identification information which may be entered into a centralized database. Once the software is validated, a consumer may print out a list selected Virtual Coupons™ displayed on a Graphical User Interface (GUI). When a product is purchased, the UPC code of the product may be compared electronically with a list of Virtual Coupons™ authorized for a particular consumer. An appropriate coupon discount may then be applied and the Virtual Coupon™ may be considered "redeemed". Once redeemed, consumer ID information and Virtual Coupon™ information may be retrieved electronically and used to update a central database. Accurate data may then be produced illustrating which consumers or groups of consumers are redeeming which Virtual Coupons™. Such data may be used for marketing purposes or to generated further diskettes for distribution targeting specific consumers or groups of consumers with specific classes of Virtual Coupon™ offerings. The use of Virtual Coupons™ eliminates or reduces fraud, and allows a frequency card discount to be applied only a limited number of times.

20 Claims, 14 Drawing Sheets

ELECTRONIC DISCOUNT COUPONING METHOD AND APPARATUS FOR GENERATING AN ELECTRONIC LIST OF COUPONS

CROSS-REFERENCE TO RELATED APPLICATIONS

The present application is a Continuation-In-Part of U.S. Application Ser. No. 08/491,367, filed Jun. 16, 1995, now U.S. Pat. No. 5,710,886, incorporated herein by reference.

FIELD OF THE INVENTION

The present invention relates to an apparatus and method for distributing, generating, authenticating, and redeeming discount coupons and the like electronically. The method and apparatus of the present invention may also be used for tracking marketing data using electronic couponing techniques.

BACKGROUND OF THE INVENTION

Discount coupons and the like (e.g., "cents off" coupons, rebate coupons, special offer coupons, or the like, collectively referred to herein as "coupons") have become an integral part of marketing strategies for many products, particularly retail consumer goods, sundries, foodstuffs, hardware, clothing, and the like, typically sold at local grocery, drug, and discount stores. Product manufacturers have come to rely upon coupons, rebate and gift certificates or the like to promote new and existing products, boost sales, and obtain demographic information concerning consumer buying patterns. Consumers have come to rely upon coupons or certificates as a technique for reducing costs.

Prior art couponing techniques have had several disadvantages, not the least of which are low response rate and fraud. In the prior art, coupons may be distributed using direct mailing techniques, printed in newspapers, magazines, or the like, distributed with other commercial goods (e.g., laundry soap coupon packaged with washing machine), or distributed (e.g., by original equipment manufacturers or OEMs) with the same or like goods, computers or the like (e.g., "cents off" toward next purchase). Such techniques require massive amounts of printing and distribution, and historically have a low response rate (e.g., typically less than 2% of coupons distributed are redeemed). Thus, such mass-distribution techniques may not be cost effective, and are not environmentally friendly, due to the large amount of paper wasted.

Such low response rates may be due in part to the difficulty a consumer may have in maintaining, cataloging, and finding appropriate coupons before shopping. A particular consumer may have at his or her disposal only those coupons which have been sent to him or her and have been retained by the consumer. Moreover, since many coupons have expiration dates, a consumer may have to carefully catalog each coupon to insure that it is redeemed before such an expiration date occurs. Such techniques are time-consuming arid cumbersome. Generally, only those consumers on a budget or those who use couponing as a hobby have sufficient time to maximize their use of available coupons. Busier and more affluent consumers may not believe that such coupon management techniques are cost effective. This latter group of consumers may represent a more desirable demographic for a product manufacturer to attract or track.

With the advent of double or even triple redemption couponing promotions provided by some retail stores (e.g., grocery store chain or the like) as well as generous cash rebate coupon promotions (i.e., gift certificates or the like), fraud had become an every increasing problem in coupon marketing. Color photocopiers may create coupons which are indistinguishable from originals. Unscrupulous consumers may use such copied coupons to purchase large numbers of items at reduced prices or fraudulently obtain rebates for products which were never purchased. Moreover, some unscrupulous retailer may conspire with coupon brokers to redeem large numbers of illicitly obtained or generated to defraud manufacturers.

As coupon discounts or rebates may be used for promotional purposes, the resulting net price to the consumer with such a discount may be less than the product manufacturer's wholesale price. A product manufacturer may offer such steep discounts in the hope of obtaining future sales at full retail prices. If a consumer uses a photocopied coupon for multiple purchases of a retail item, the product manufacturer may not obtain the desired repeat sales at full retail price, and the entire scheme of couponing may be defeated.

In addition, prior art couponing techniques have yielded little, if any, useful data to product manufacturers regarding who is redeeming such coupons. Consumer demographic data is invaluable to a product manufacturer in determining which products to target to particular consumer groups (e.g., through particular advertising venues). Moreover, such demographic data may be used to more efficiently distribute future coupons. In addition, information as to the buying habits (i.e., recency, frequency, and monetary value or RFM) and demographics of particular consumers or groups of consumers has a market value and such information may be sold or traded for a profit.

Various techniques have been tried to eliminate or reduce fraud, provide more convenient techniques for distributing coupons, and to better track consumer demographic data.

De Lapa et al., U.S. Pat. No. 5,353,218 discloses a focused coupon system. FIG. 6 of De Lapa et al. is most illustrative. De Lapa et al. discloses a system for distributing coupons with a machine readable code (barcode) containing both customer and coupon identifications. The consumer code may be replaced with a generic code used in a look-up table for coupon verification and information. The entire machine readable code may be captured and uploaded to a central database for determining coupon and consumer identification. The uploaded information may be used for marketing purposes (to determine which coupons to next send to the consumer) and/or for rebate purposes.

Although the system of De Lapa et al. attempts to provide a more focused distribution technique, the system still relies upon paper coupons being distributed to consumers. Consumers may throw out such mass mailings (i.e., "junk mail") without opening them. Moreover, the system relies upon the consumer supplying demographic information in a questionnaire or the like in order to be provided with the coupons. Moreover, since the coupons of De Lapa et al. are preprinted, coupon trading or copying may be more prevalent.

Furthermore, in De Lapa et al., no mechanism is present for capturing subsequent demographic information. In addition, as consumer data is captured at the store level, an additional mechanism may be required to upload such consumer information to a centralized database to capture consumer demographic information. Additional data processing hardware/software may be required at a retail store in order to process such data. Thus, retailers may be initially reluctant to invest in such a scheme.

In retailing, it may be essential to check out consumers in as little time as possible. Thus, if additional processing time is required during customer check-out to process the coupons of De Lapa et al. retailers may be less likely to accept adopt such technologies.

Moreover, under the scheme of De Lapa et al., there is no mechanism provided to insure that the individual who receives the coupons is the targeted individual. If a consumer moves to a new address, new occupants at the old address may receive and redeem coupons addressed to the consumer. Thus, target tracking data may be inaccurate or incomplete.

Murphy, U.S. Pat. No. 5,305,195, issued Apr. 19, 1994, discloses an interactive advertising system for on-line terminals. A series of remote terminals receive compressed and encoded video advertising signals which may be stored on an internal hard drive. The advertising videos are played, and a consumer may select products using the terminal. In FIG. 4, (Col. 7, lines 45–50) Murphy discloses that a printer may be provided for printing selected coupons.

The apparatus of Murphy may solve some of the problems associated with distributing coupons in paper form. However, The Murphy system appears to be more concerned with directing advertising information than collecting demographic information or distributing coupons. Thus, it does not appear that the apparatus of Murphy is equipped to process demographic information or reduce coupon fraud. Moreover, Murphy discloses his apparatus for use in college campuses, a limited and narrow consumer demographic.

Von Kohorn, U.S. Pat. No. 5,128,752, issued Jul. 7, 1992 discloses a system and method for generating and redeeming tokens selected from television data. Product information and authentication data may be transmitted and displayed on a television and a home printer. A viewer may select a coupon for printing and redeem the coupon at a retail store.

Von Kohorn does disclose a technique for reducing fraud (Col. 7, lines 16–38). However, it appears that these techniques require action at the retail level to verify that a coupon is indeed legitimate, including, in one embodiment, requesting identification credentials from the consumer. Such techniques may be intrusive and cumbersome to use in a retail establishment where a number of coupons may be redeemed at any given time.

Moreover, it does not appear in the system of Von Kohorn, which relies on broad-casting, does not target specific consumers with particular coupons. Rather, it appears that the coupons are distributed to all viewers equipped with the appropriate apparatus. Note that: in FIG. 6 (Col. 9, lines 40–48) Von Kohorn discloses a technique for recording marketing data from consumer information encoded into the coupon.

Axler et al., U.S. Pat. No. 5,305,197, issued Apr. 19, 1994, discloses a coupon dispensing machine with feedback. A consumer kiosk is placed in a retail establishment or the like to display advertising (LED scroll) and allow customers to print out selected coupons. A proximity sensor detects the presence of customers near the apparatus.

The Axler device may solve some of the problems associated with paper distribution of coupons. However, it does not appear that the Axler device may retrieve any significant amount of consumer demographic data other than the number and type of coupons printed. Moreover, within the in-store environment, it may be difficult to enter such consumer data, particularly with the keypad disclosed by Axler. Thus, it does not appear that the Axler device may be suitably adapted to retrieve consumer demographic data.

A fundamental fault with the Axler device is that it does not appear to target or prior motivate customers with to visit a retailer with specific coupons. Rather, the in-store location of the Axler device may facilitate a consumer "targeting" a coupon. In other words, a consumer may make a number of product selections in a store and then visit the coupon kiosk of Axler to determine whether any purchases are subject to coupon discount or rebate. Thus, the fundamental goal of couponing—to motivate a consumer to purchase a product—may be compromised.

In addition, the kiosk of Axler may occupy valuable commercial retail space. In a retail store (e.g., supermarket or the like) even a few feet of shelving may be extremely valuable for displaying and containing retail merchandise. Product manufacturers may even pay "rent" to a retail establishment in the form of rebates or promotional fees in order to obtain prominent shelf space. Thus, a retail establishment may be loathe to give up such valuable space to a couponing kiosk. Moreover, it may be time consuming and frustrating for customers waiting in line to access the kiosk. Providing additional kiosks may be cost-prohibitive.

Tai, U.S. Pat. No. 4,908,761, issued Mar. 13, 1990, and assigned to Neighborhood Marketing Corporation, describes a system for identifying heavy product purchasers who regularly use manufacturers' purchase incentives and predicting consumer promotional behavior response patterns. Delivery of coupons to selected consumer households also includes the use of a plurality of consumer activated coding devices (bar coded stickers) which may be attached to the coupon. The bar coded sticker indicates the name and address of the receiving consumer. When the coupon is redeemed and read, data may be collected determining which consumers of the selected consumer households redeemed which products, as well as size and price of the product purchased.

One disadvantage of the sticker system of Tai is that it requires a consumer to go through the laborious task of affixing stickers to individual coupons manually. Thus, the technique may not reach beyond the traditional coupon-clipping demographic. Product manufacturers may be more interested in the buying habits of more affluent purchasers, who may be less inclined to spend time affixing stickers to coupons.

Moreover, the device of Tai does not appear to address the data reliability problem in the couponing business. Once a sticker is attached to a coupon, it may be redeemed. Thus, coupons with stickers attached may be sold, traded, or swapped with other coupon aficionados, and thus true demographic data may be lost or inaccurate. If the person redeeming the coupon is not the targeted consumer, the preference for that product, inferred from the coupon redemption, may not reflect the purchasing desires of the target consumer, but rather that of another person.

The Tai system appears to some features which may be used to assist in fraud detection. For example, by applying a sticker to the coupon, it may be more difficult for an individual to photocopy a coupon for subsequent re-use. If a coupon is photocopied with the sticker in place, the resultant copies may be more readily detectable as fraudulent due to the lack of a real sticker being present. Moreover, as the sticker may indicate a consumer name, it may be possible to trace such fraud or at least discourage such fraud, as the consumer will know that his or her name is attached to the coupon.

However, as present coupons do not use stickers, it may be possible that a checkout person may not detect a fraudulent coupon (e.g., photocopied sticker) and thus the coupon may be redeemed. Once redeemed, it may be difficult to prove a particular consumer cashed a particular coupon. Moreover, coupon fraud may not be limited to consumers alone. Store owners, managers, and distributors may attempt to fraudulently replicate coupons for redemption. Thus, a consumer may redeem a stickered coupon, only to have it copied by an unscrupulous person in the redemption chain. Falsely accusing a consumer of coupon fraud could backfire and lead to potential legal and public relations problems for manufacturers.

Moreover, the Tai system still relies upon paper coupons, which may be difficult to count, sort, and redeem. Consumers may be adverse to using paper coupons, as such coupons may be difficult to cut out, handle, and store. Redemption and counting of paper coupons may be a time consuming and laborious task, both at the retail level, and at coupon clearing houses. Moreover, paper couponing techniques may be much more prone to fraud due to counterfeiting.

Many grocery stores have in place so-called "savings clubs" or frequency programs. For example, the Safeway® chain of retail supermarkets distributes a "Savings Card" to consumers. For the purposes of this application, such cards may be referred to as "frequency cards". A frequency card may comprise a combined check cashing and discount card provided with a magnetically encoded strip. Once a consumer has checked out at a grocery or other store, the card is read by a magnetic reader. Data from the card verifies the identity of the consumer for check cashing purposes, if required. Moreover, the consumer identification may also be stored, along with data indicating which products were purchased. In addition, special "in-store" or advertised promotional discounts for selected products may be applied to reduce a consumer's total bill.

It should be noted that the use of debit and credit cards for retail grocery shopping has increased dramatically. Retailers prefer the use of such cards, as they reduce the incidence of bad check charges and the like associated with conventional payment methods. Moreover, use of debit and credit cards reduces the amount of cash received, thus reducing opportunities for internal theft and making stores less attractive robbery targets. Thus, for the purposes of this application, the term "frequency card" may be construed to include credit and debit cards and the like.

Such frequency cards may be very useful in collecting consumer demographic data. However, such cards may have some drawbacks when attempting to promote individual products. For example, if a consumer is aware that use of the card will result in automatic deduction of promotional discounts from his or her total bill, then the consumer may automatically use the card without consciously choosing the promotional items first. Any savings due to promotional discounts may be viewed by the consumer as windfalls, rather than planned strategic buying decisions. Product manufacturers and distributors may instead wish to alert a consumer to specific promotional discounts to motivate consumers to look for particular products when visiting a store.

Thus, it remains a requirement in the art to provide a fraud-resistant, easy-to-use, paperless technique and system for inducing consumers to shop for particular products to obtain particular discounts while simultaneously capturing consumer discount redemption data.

SUMMARY AND OBJECTS OF THE INVENTION

In a method and apparatus for distributing and generating coupons, a database is generated comprising at least a list of consumer names and addresses. A package of data for a selected group of consumers is generated for the consumers on the list. The package of data includes coupon data. The package of data is transmitted to the selected group of consumers from the list. Demographic and identification data received from a consumer from the selected group of consumers may then entered into the database. A validation code may then transmitted to the consumer's computer so as to allow the consumer's computer to generate a coupon list from the coupon data in the package of data. A coupon list may then be generated from the consumer's computer in response to a consumer selection, from the coupon data in the package of data.

A consumer may then redeem coupon values listed on the coupon list by presenting the purchase items, along with a consumer card (preferably an existing frequency card) at a checkout register. Alternately, the coupon list may be provided with a bar code or the like, which may be read at check-out and used as a temporary frequency card. In yet another embodiment, a bar code on the virtual coupon list may be scanned and used to trigger mailing of a frequency card to the consumer.

Coupon discounts may then be applied automatically using a retailer's point-of-sale device. The number of discounts being offered may be suitably appended and consumer data captured internally. The process eliminates the need for any additional back-room paper handling and would virtually wipe out the possibility of internal and/or external fraud. The couponing process of the present invention would offer both the retailer and manufacturer a fully automated audit trail.

The package of data may be transmitted to a consumer's computer by diskette, on-line or dial-up. The number of times a consumer has redeemed a given coupon discount may be counted to indicate fraud if the number of times a coupon is redeemed by the consumer exceeds a predetermined amount. In response to information retrieved from redeemed coupon discounts, a revised database may be generated and a new revised package of data for a revised selected group of consumers may be transmitted.

It is an object of the present invention to improve consumer response to coupon distribution campaigns.

It is a further object of the present invention to provide more accurate data of which consumers redeem particular coupons in a coupon distribution campaign.

It is a further object of the present invention to provide additional demographic data correlated to consumer and coupon redemption for a coupon distribution campaign.

It is a further object of the present invention to reduce or substantially eliminate the incidence of fraud in the redemption of coupons or copying of coupons.

It is a further object of the present invention to improve consumer response to a coupon campaign by targeting consumers with specific coupon product lines in response to demographic data generated from previous coupon campaigns.

It is a further object of the present invention to reduce or eliminate handling of paper coupons by consumers, retailers, distributors and manufacturers in the coupon redemption chain.

These and other objects of the present invention will be realized in connection with the detailed description of the preferred embodiment set forth below.

BRIEF DESCRIPTIONS OF THE DRAWINGS

DETAILED DESCRIPTION OF THE INVENTION

In the present invention, traditional paper coupons may be eliminated entirely. Thus, a new name is needed to describe coupon discounts available to a consumer. Such discounts may not be available repeatedly for a given consumer, but may be available only for a single or limited number of uses. Moreover, such discounts may not be available for all consumers, but rather for selected consumers. Thus, the discounts of the present invention have similar aspects to coupons, but do not rely upon traditional paper couponing techniques. For the purposes of this application, such coupon discounts may be referred to as "Virtual Coupons™". VIRTUAL COUPON™ is a trademark of SellectSoft, L.C.

A Virtual Coupon™ may not have a physical existence per se, but may be represented on a computer screen by an icon, graphical image, or the like. Once selected by a consumer, a Virtual Coupon™ may be redeemable in as concrete a manner as a traditional paper coupon. However, the coupon may exist only as electrically or optically stored data and not as a traditional paper coupon.

Figure 5:
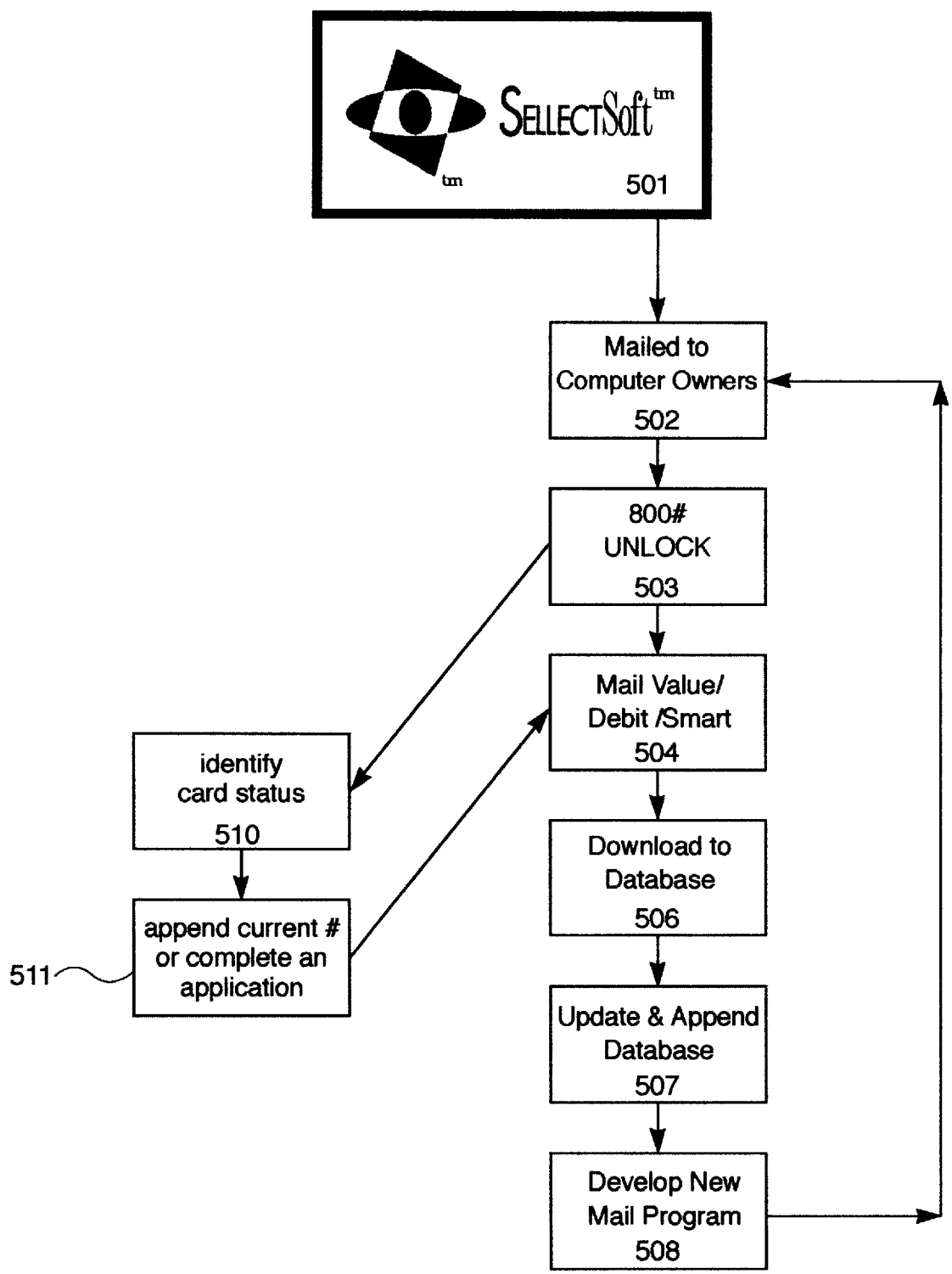
FIG. 5 is a block diagram illustrating the operation of the apparatus and method of the present invention.

Referring now to FIG. 5, an overview of the operation of the method and apparatus of the present invention is illustrated in the form of a flowchart. In step 501, a SELLECTSOFT™ diskette may be created containing Virtual Coupon™ information and program data for displaying and generating Virtual Coupons™. SELLECTSOFT™ and SELLECTsoft™ are trademarks of SELLECTSoft, L.C. The SELLECTSOFT™ diskette may contain data for generating a number of Virtual Coupons™ for different products. An initial diskette may contain a standard selection of Virtual Coupons™ or may be tailored according to predetermined consumer demographic data or manufacturers specification.

In step 502, SELLECTSOFT™ diskettes are mailed to consumers, preferably computer owners. Computer ownership is readily obtainable demographic information available from warranty registrations, on-line service memberships, software purchases, magazine publishers or the like. A SELLECTSOFT™ diskette may even be preformatted in a prescribed format (e.g., MS-DOS™, Windows™, MacIntosh™ or the like) corresponding to consumer demographic data. Moreover, consumer demographic data may be used to provide the SELLECTSOFT™ diskette with appropriate system and printer drivers for each consumer.

Figure 3:
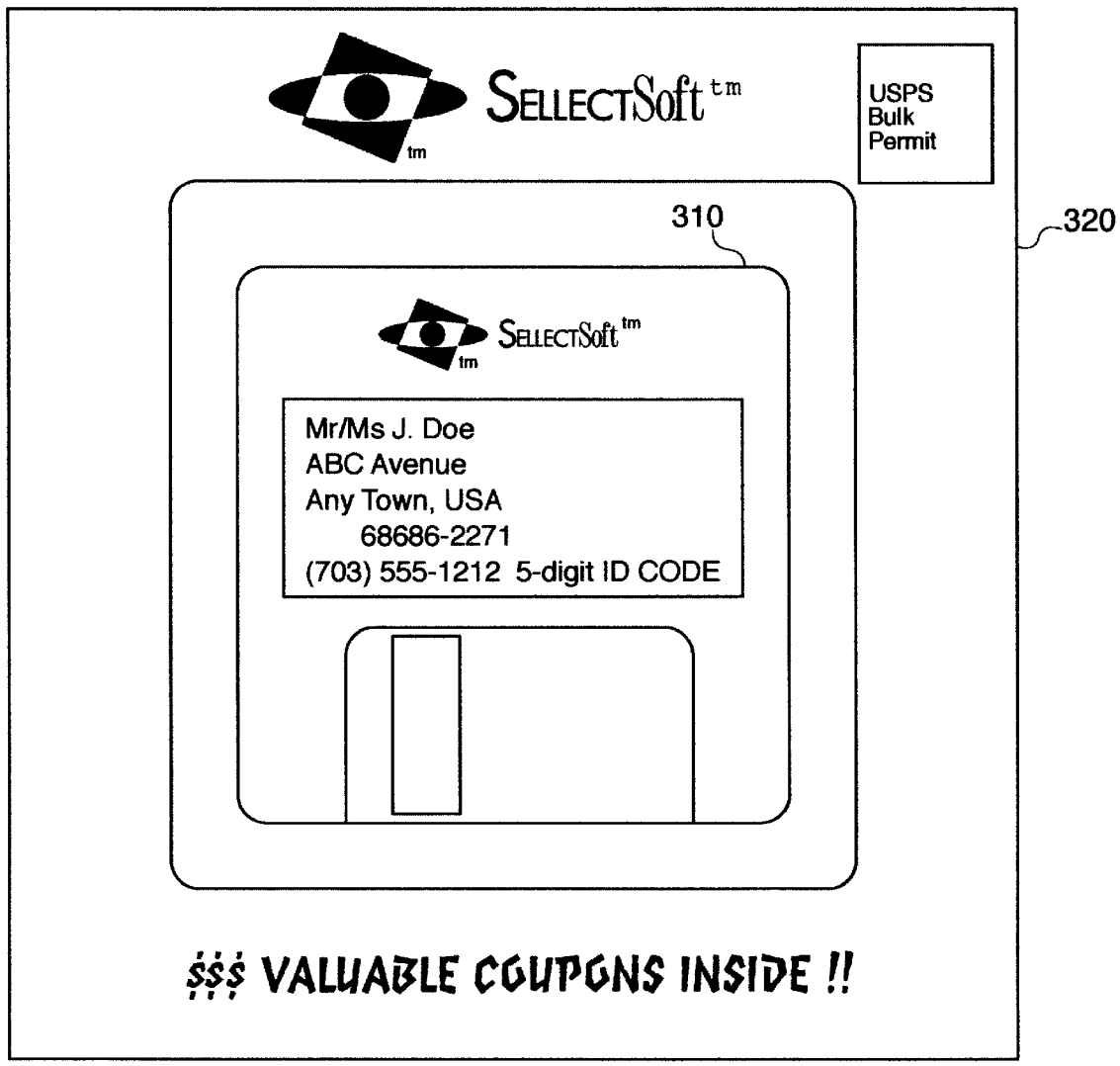
FIG. 3 is a front view of a diskette mailer illustrating the packaging of a SELLECTSOFT™ diskette.

SELLECTSOFT™ diskette 310 may be attractively packaged as illustrated in FIG. 3 in a bulk diskette mailer 320 so as to entice the consumer into opening the package and investigating the software contained therein. SELLECTSOFT™ diskette 310, attractively packaged, may pique consumer interest in a manner not possible with other types of coupon mass-mailing. A consumer may be more reluctant to throw away a computer diskette than a package of bulk-mailed coupons. Thus, a computer diskette may have a longer "table life" in the consumer home than a package of bulk mailed coupons. As a large number of Virtual Coupons™ may be stored in one diskette, the frequency of such mailings may be significantly reduced. Thus, the overall cost of distributing SELLECTSOFT™ diskette 310 may be equal to or less than conventional bulk mailing techniques.

Although illustrated as a computer diskette, SELELCTSOFT™ diskette 310 may also comprise a SELLECTSOFT™ CD-ROM. CD-ROMs have the potential to hold vastly more data than a diskette. Moreover, the cost of CD-ROMs and CD-ROM drives continues to fall rapidly. Thus, many new so-called multimedia computers may be equipped with CD-ROM drives. Moreover, as many marketers (e.g., America On-Line™, Prodigy™, CompuServe™ and the like) continue to flood the market with diskette mailings, consumers may have a lowered resistance to throwing away "valuable" diskettes and an increased resistance to loading such diskettes onto a computer. CD-ROMs, on the other hand, have yet to see such mass mailing, and thus may have an additional consumer enticement factor associated with them.

In addition, SELLECTSOFT™ diskette 310 may be substituted or augmented by downloading of data from an on-line service, Internet connection, E-mail, Website or the like. For example, it is entirely within the spirit and scope of the present invention to provide an interactive Website or BBS to allow a user to download SELLECTSOFT™ data. Initial consumer contact may be made through paper mailing or mailing of SELLECTSOFT™ diskette 310. Alternatively, a consumer may be contacted through E-mail from an E-mail mailing list, or a list automatically garnered from Usenet postings.

A user may contact the SELLECTSOFT™ Website or BBS to upload demographic information and download Virtual Coupon™ information. For a BBS embodiment, a SELLECTSOFT™ diskette may be provided which includes modem software and a Graphical User Interface (GUI) tailored to Virtual Couponing™. A local dial-up may be provided for the consumer to connect his or her computer to a SELLECTSOFT™ BBS. Once connected to the SELLECTSOFT™ BBS, a consumer may upload demographic information when prompted and download Virtual Coupon™ information.

An advantage of a SELLECTSOFT™ BBS is that such a system may allow local store chains and small retailers to operate an interactive computer site without the need for Internet connectivity. Moreover, when connected to the SELLECTSOFT™ BBS, a consumer may view or download other information, such as store hours, locations, and sales information more closely tailored to the needs of a local or regional store chain.

A SELLECTSOFT™ Website, on the other hand, may be more tailored to a national audience, and thus may contain data from manufacturers and distributors to promote product usage. A consumer may download Virtual Coupon™ data from a SELLECTSOFT™ Website after uploading consumer demographic information.

SELLECTSOFT™ diskette 310 may be provided with a date code such that the software within SELLECTSOFT™ diskette will become disabled once the date indicated by the date code has elapsed. Once the date has elapsed, the consumer may be prompted to call the 1-800 number to receive a new diskette or receive a new authorization number or download new Virtual Coupon™ data.

By providing a date code, Virtual Coupons™ generated by the SELLECTSOFT™ diskette may be provided with an effective expiration date in addition to expiration dates which may be printed on the face of the Virtual Coupon™. In order to reduce material costs and environmental impact issues, SELLECTSOFT™ diskette 310 may be mailed with a return postage paid mailer for return of the diskette once all Virtual Coupons™ have been redeemed or when a new diskette has been issued.

In SELLECTSOFT™ BBS or Website embodiments, individual Virtual Coupons™ may be provided with date codes. Each Virtual Coupon™ may be displayed with a "redeem by" date. A consumer may download such Virtual Coupons™ and view them at any time locally on his or her own computer. If one or more of the downloaded Virtual Coupons™ have expired, a consumer may be prompted to reconnect to the SELLECTSOFT™ BBS or Website to download a fresh set of Virtual Coupons™ for redemption.

The home computer owner demographic may be a desirable demographic for retailers to reach. Typically, home computer owners have higher education and income levels and may have larger amounts of disposable income. Moreover, the home computer user demographic, although changing rapidly, is heavily male. Paper Virtual Coupons™ traditionally have a largest responding audience amongst females. Thus, SELLECTSOFT™ diskette 310 may more readily reach desirable consumer demographic groups missed by traditional paper Virtual Couponing™ techniques.

In step 503, a consumer may load SELLECTSOFT™ diskette 310 into his or her computer either by running the SELLECTSOFT™ software from the B:\ drive, or by loading at least a portion of the SELLECTSOFT™ software into the hard drive of the consumer's computer. In Windows™ applications, an icon may be generated on the consumer's Window™ screen. The consumer may click on such an icon to initiate operation of the SELLECTSOFT™ software. In order to prevent or reduce fraud, the portion of the SELLECTSOFT™ software stored on a consumer's hard drive may prompt the consumer to insert the SELLECTSOFT™ diskette 310 into the consumer's B:\ drive (or the like).

Figure 4:
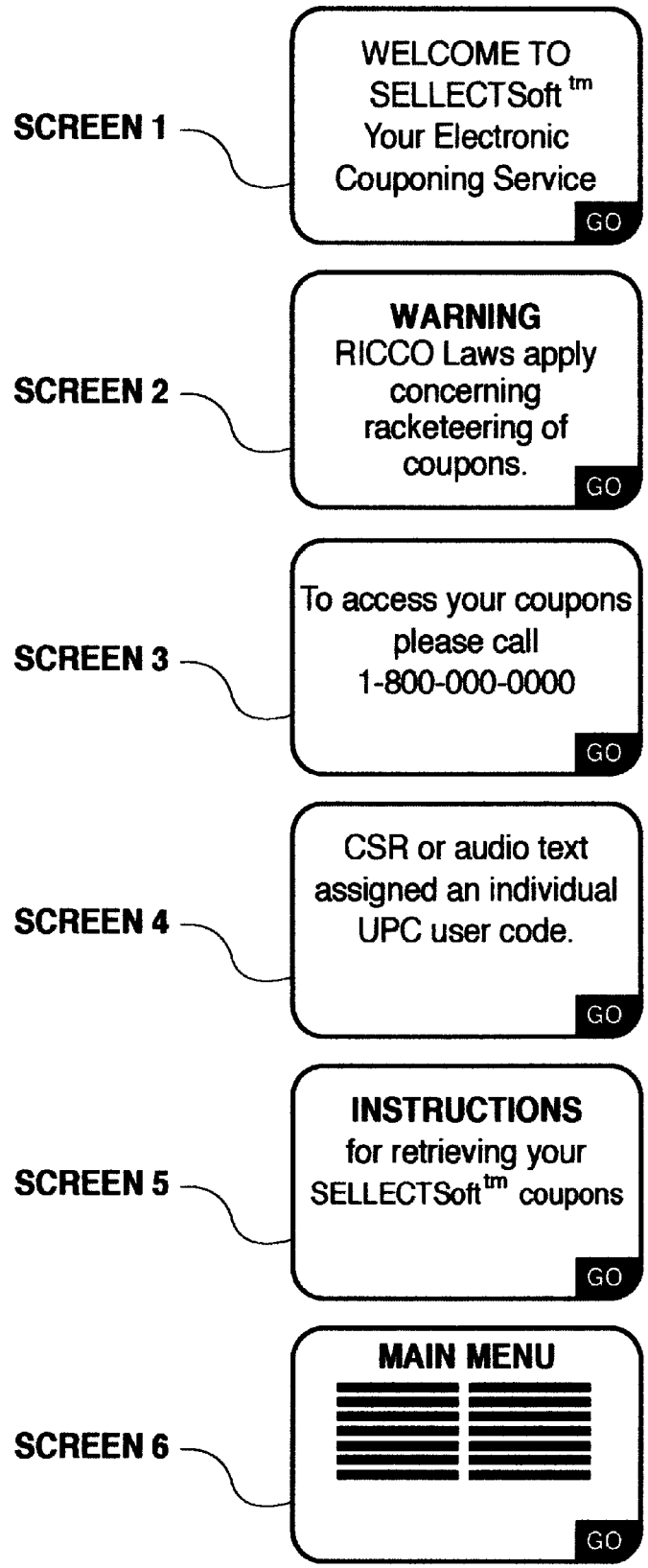
FIG. 4 illustrates a sequence of user screens in operation of the method and apparatus of the present invention.
Figure 10:
FIG. 10 illustrates a detail of screen 1 of FIG. 4.

Once the SELLECTSOFT™ software has been loaded into the consumer's computer, the consumer may then view a greeting screen, such as that shown in FIG. 10, or in screen 1 of FIG. 4. In addition, a warning screen, such as screen 2 of FIG. 4 may also be displayed. The consumer may next be prompted to call a 1-800 or audiotext number on the screen, as illustrated in screen 3 of FIG. 4, and in FIG. 11. Such toll free numbers may serve a number of purposes. First, if the consumer is having difficulty operating the software on SELLECTSOFT™ diskette 310 or if SELLECTSOFT™ diskette 310 is defective (e.g., exposed to high magnetic field during shipping) an operator may assist the consumer in resolving the problem or in shipping a new SELLECTSOFT™ diskette 310.

Second, the 1-800 or audiotext number may be used to obtain an authorization number to unlock the software in SELLECTSOFT™ diskette 310. This authorization number may be used to prevent unauthorized use of the SELLECTSOFT™ software by unintended targets (e.g., new occupant at consumer's old address) and provide a means for reducing fraud as will be discussed in more detail below. Third, in connection with the authorization number, the 1-800 number may be used as a means of collecting additional demographic data, such as age, income, or the like.

To prevent unauthorized use of SELLECTSOFT™ diskette 310, various means may be employed to verify that a targeted consumer is indeed the caller on the 1-800 number. Automatic Number Identification (ANI) sometimes referred to as "Caller-ID" may be utilized to confirm that the caller is indeed calling from the target consumer's residence. Correct residence phone number information may be provided from a consumer database or may be entered at this point for future use. If a consumer is not calling from his home phone (e.g., office, cell phone or the like) a 1-800 operator may then query the consumer for this discrepancy.

In step 503, the 1-800 operator may obtain marketing information from the consumer and store such information in the consumer database. Marketing information may include age, marital status, income level, children present, or the like. In addition, the operator may verify that the name spelling and address are correct. Once the consumer has provided this information to the 1-800 operator, a validation number may be given to the consumer to enable/unlock the software in SELLECTSOFT™ diskette 310.

In step 510 a telemarketer may determine whether the consumer is presently, a frequency card holder. In step 511, the telemarketer will append the current database of a frequency card holder with additional demographic information, and/or enable Virtual Coupon™ discounts for a consumer. If the consumer is not a frequency card holder, an application for frequency card may be filled out over the phone, once complete, the consumer may be given an authorization code as discussed above. It should be noted that in an alternative embodiment, such data may be gathered using automated techniques, for example by voice prompt, on-line connection, or the like.

In step 504 consumers without frequency cards may be mailed a frequency card in response to the frequency card application of step 511. In alternative embodiments, a debit or smart card may be used in addition to or as an alternative to a frequency card. In the preferred embodiment, a non-specialized card may be used, such that a consumer need not carry an additional 'coupon' card with him or her to the store.

As discussed above, the elements of steps 503, 510, and 511 may also be achieved by using a computer dial-up or Internet access. A consumer may be prompted to fill out an electronic "form" in order to receive authorization. Such a form may be filled out off-line and data uploaded in a similar manner as is presently done for warranty information for new computer systems. Alternatively, such information may be provided on-line or through an Internet connection (e.g., e-mail or Website). Authorization may be provided to a consumer's computer directly through such a dial-up or Internet connection in a manner invisible to the consumer. Alternately, a code word or alphanumeric may be provided to the consumer as a "key" to unlock the SELLECTSOFT™ software.

The validation number may then be entered by the consumer into his computer, when prompted by the SELLECTSOFT™ software. The process by which the SELLECTSOFT™ software is unlocked uses an algorithm which takes into account numerous pieces of information including the consumer's name, serial number of SELLECTSOFT™ diskette 310, and date of activation. One advantage of this approach to authorizing the software is that replication of the software is simplified, as each diskette within a campaign may be identical.

As part of the authorization process in step 503, a consumer may provide a PIN number corresponding to a store frequency card. Such a PIN number may be used as a method of verification. Once verified, a card member need not call the 1-800 number or otherwise be authorized. Alternately, existing card members could be pre-authorized or authorized when obtaining cards. As discussed below, the apparatus and method of the present invention, by using Virtual Coupons™, effectively prevents unauthorized users from redeeming coupon discounts.

The use of a frequency card may eliminate or reduce the need for demographic information gathering at step 503. Such information may instead be obtained from existing frequency card data, or may be gathered at the time a frequency card is applied for. As a frequency card may also qualify as a check cashing card, consumers may be less inclined to object to requested personal information (e.g., marital status, number of children, annual income, and the like) and may be more inclined to provide accurate information, as the card may be used as a financial instrument. In contrast, consumers may be less inclined to provide information (or accurate information) in order to receive coupon discounts. Such information requests are more clearly discerned by consumers as attempts at gathering marketing data and may be viewed as an invasion of privacy.

The use of Virtual Coupons™ may eliminate or reduce the need for physical coupon processing at a traditional coupon brokerage house. Such coupon brokerage houses receive coupon and redemption data from retailers and package such data for manufacturers such that retailers may be reimbursed for coupon redemptions. Instead, data gather through a store's computer system may be transmitted directly to a manufacturer (or though a coupon broker) for further redemption. A coupon brokerage may process such data to retrieve the unique consumer ID number and purchasing data and upload such data to the SELLECTSOFT™ database as illustrated in step 506.

In step 506, a consumer may purchase products at a store and receive Virtual Coupon™ values using his or her frequency card. During checkout, using traditional scanning equipment, the universal product code (UPC) and product numbers for each product may be retrieved and stored. Such data may be uploaded is step 507 for later use in generating demographic purchasing studies. Data concerning Virtual Coupon™ values redeemed, as well as other purchase data may be downloaded to the SELLECTSOFT™ database. In step 507, the SELLECTSOFT™ database may be updated and appended with consumer purchase information from step 506 to provide a better profile of the purchasing habits of each consumer.

Consumer ID information may be utilized to update the SELLECTSOFT™ database as illustrated in step 507. Once SELLECTSOFT™ database records are updated with ID number information, a new SELLECTSOFT™ mailing program may be developed in step 508 using the demographic and purchasing information generated from a previous mailing of SELLECTSOFT™ diskette 310. Subsequent mailings may be mailed on a weekly, monthly or quarterly basis, depending upon consumer use of SELLECTSOFT™ Virtual Coupons™ and other marketing factors.

Copy protection techniques may be used to prevent further copying of SELLECTSOFT™ diskette 310. For example, a known bad sector may be placed on the diskette to prevent duplication of the diskette using DOS utilities. However, prevention of duplication may not be a long term concern, as the real-time authorization system for authorizing the SELLECTSOFT™ software may severely reduce or eliminate fraud from Virtual Coupon™ duplication.

As an alternative to, or in conjunction with a live 1-800 operator, an audio text system (e.g., voice mail menu or the like) may be provided for retrieving marketing data and dispensing validation numbers. Upon calling the 1-800 number, the consumer may be prompted through a series of voice menus. The consumer may enter information using the touch-tone™ keypad on a telephone.

Alternately, or in addition to the techniques discussed above, SELLECTSOFT™ diskette 310 may be provided with modem communications software to upload marketing information via modem (if the consumer is so equipped) and download validation information. Such a technique may operate in a manner similar to warranty registration software typically packaged with computer and software. The consumer may enter marketing information in an applications screen in Windows™ via keyboard on his or her compute. Once entered, such data may then be stored and uploaded via modem to the SELLECTSOFT™ database. Once such demographic and identification information is received, a validation number may then be downloaded to the consumer's computer via the same modem connection.

Figure 11:
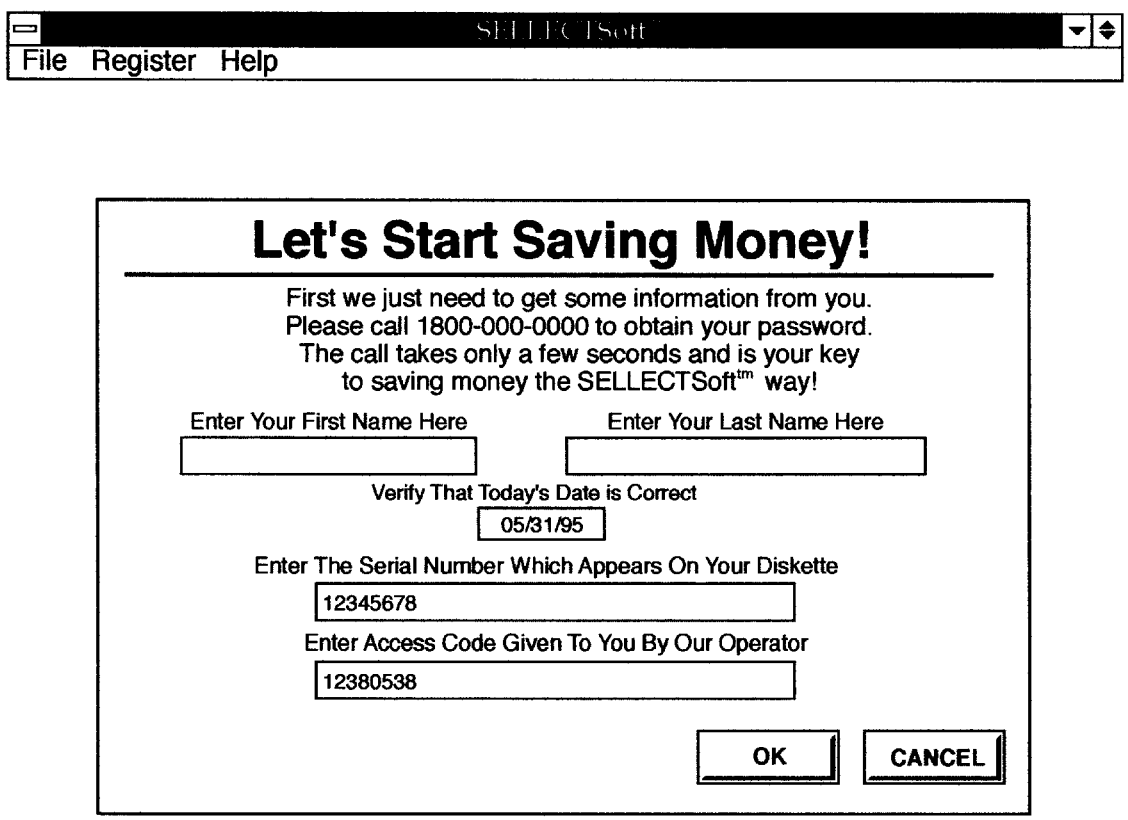
FIG. 11 illustrates a detail of screen 3 of FIG. 4.

Once the consumer has received a validation number, he may operate the software contained in SELLECTSOFT™ diskette 310. The operation of the software within SELLECTSOFT™ diskette 310 is illustrated in FIG. 4 and FIGS. 10–14. In FIG. 10 and screens 1 and 2 of FIG. 4, the consumer may view greeting and warning messages. In FIG. 11 and screen 3 of FIG. 4, the consumer may be prompted to call the 1-800 number as discussed above in connection with FIG. 5. In FIG. 11 and screen 4 of FIG. 4, the consumer may then be prompted to enter his validation code as received from the 1-800 number.

The validation code may prevent unauthorized use of SELLECTSOFT™ software. Each validation number may be unique to the serial number of each SELLECTSOFT™ diskette 310. Thus, a consumer may not be able to validate his or her SELLECTSOFT™ diskette 310 using a neighbor's validation number. The validation number also insures that accurate marketing information is received from the consumer before Virtual Coupons™ are issued in order to insure that demographic data generated by the SELLECTSOFT™ system has a high degree of accuracy as compare to prior art systems. In addition, the use of the validation number reduces the number of consumers necessary to track with the system and assists in mailing list maintenance and hygiene. Consumers who do not obtain validation numbers after a predetermined period may be contacted by telemarketing personnel to inquire as to why the SELLECTSOFT™ software was not utilized, and/or to assist in persuading the consumer to utilize the SELLECTSOFT™ system.

Once a valid validation code has been entered, an instruction screen may be displayed as illustrated in screen 5 of FIG. 4. instruction screen 5 may include a tutorial on how to use SELLECTSOFT™ as well as a demonstration of SELLECTSOFT™ software.

Figure 12:
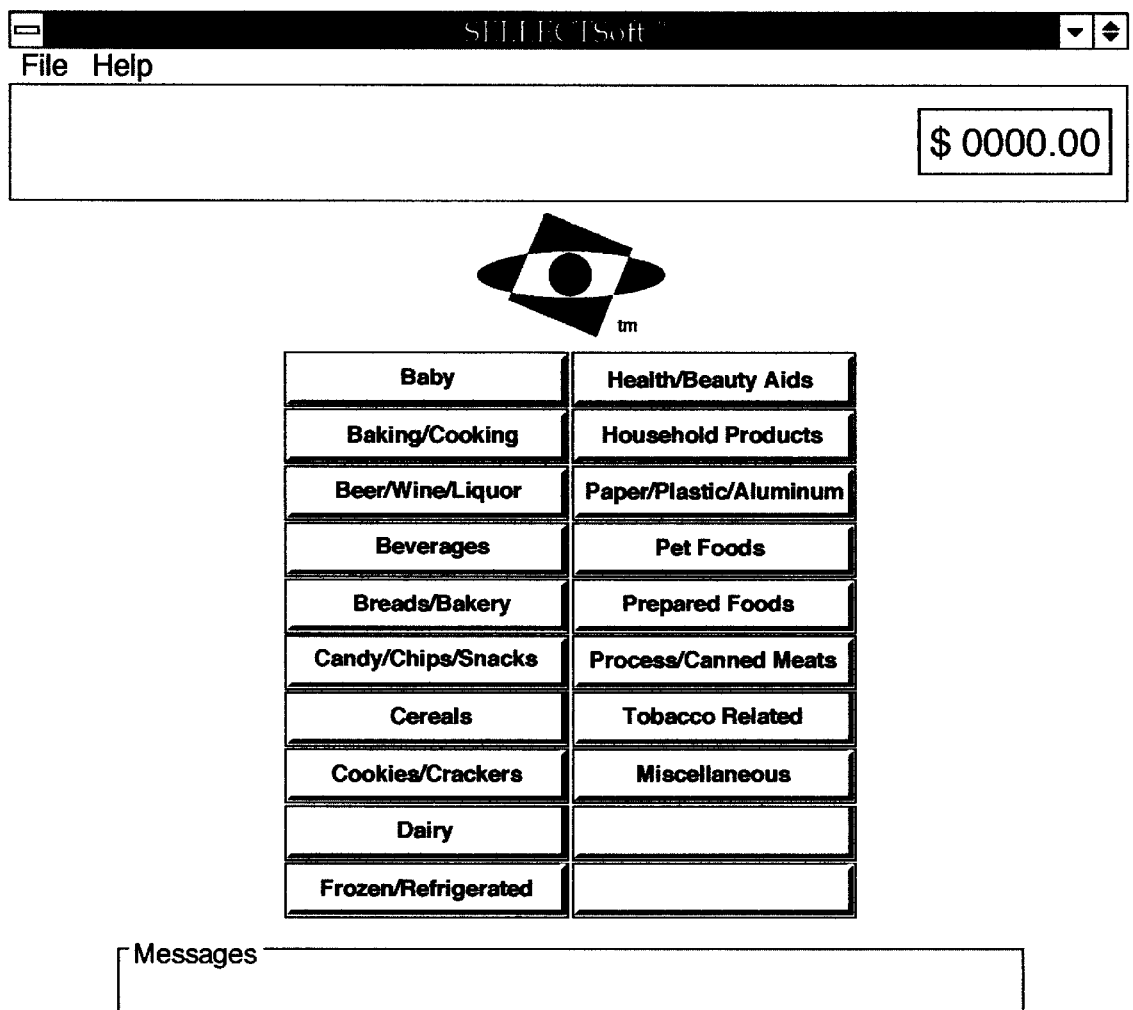
FIG. 12 illustrates a detail of screen 6 of FIG. 4.
Figure 13:
FIG. 13 illustrates a detail of a screen for selecting further subcategories of products from the screen of FIG. 12.

From instruction screen 5, the user may proceed to main menu screen 6. FIGS. 12-13 illustrate the further operation of the menu system. A consumer may click on a general category, and then click on more specific categories within that general category. It should be noted that in the preferred embodiment, the SELLECTSOFT™ software is designed to work in a Windows™ 3.0x graphical user interface (GUI) environment or Windows™NT™ GUI environment. Thus, the screens illustrated in FIG. 4 may not necessarily be displayed in the order shown. When a validation number has been previously entered, a user may proceed directly to instruction screen 5 or main menu screen 6 once the SELLECTSOFT™ software has been loaded.

From main menu screen 6, a user may select one of a number of categories of products to review. Each product may be grouped according to a category and may appear in more than one category. Example of categories may include, for example, supermarket department classifications (e.g., frozen foods, produce, meats, deli, or the like) or other types of categories of products (e.g., electronics, fast foods, or the like). The consumer may select a category by clicking on a category icon or selecting a category icon from a pull-down menu in a manner known in the art. Each category, as illustrated in FIG. 6, may comprise one or more screens containing graphical representations of Virtual Coupons™.

A user may browse through screens of Virtual Coupons™ within a category, or through various screens in various categories, as illustrated in FIGS. 12 and 13. In addition, a simple text search engine may be provided to enable the consumer to quickly find Virtual Coupons™ of interest. A consumer may enter a word or portion of a word defining a brand name, category, or generic product name. The SELLECTSOFT™ software may then display a Virtual Coupon™ or Virtual Coupons™ most closely related to the entered data.

Figure 6:
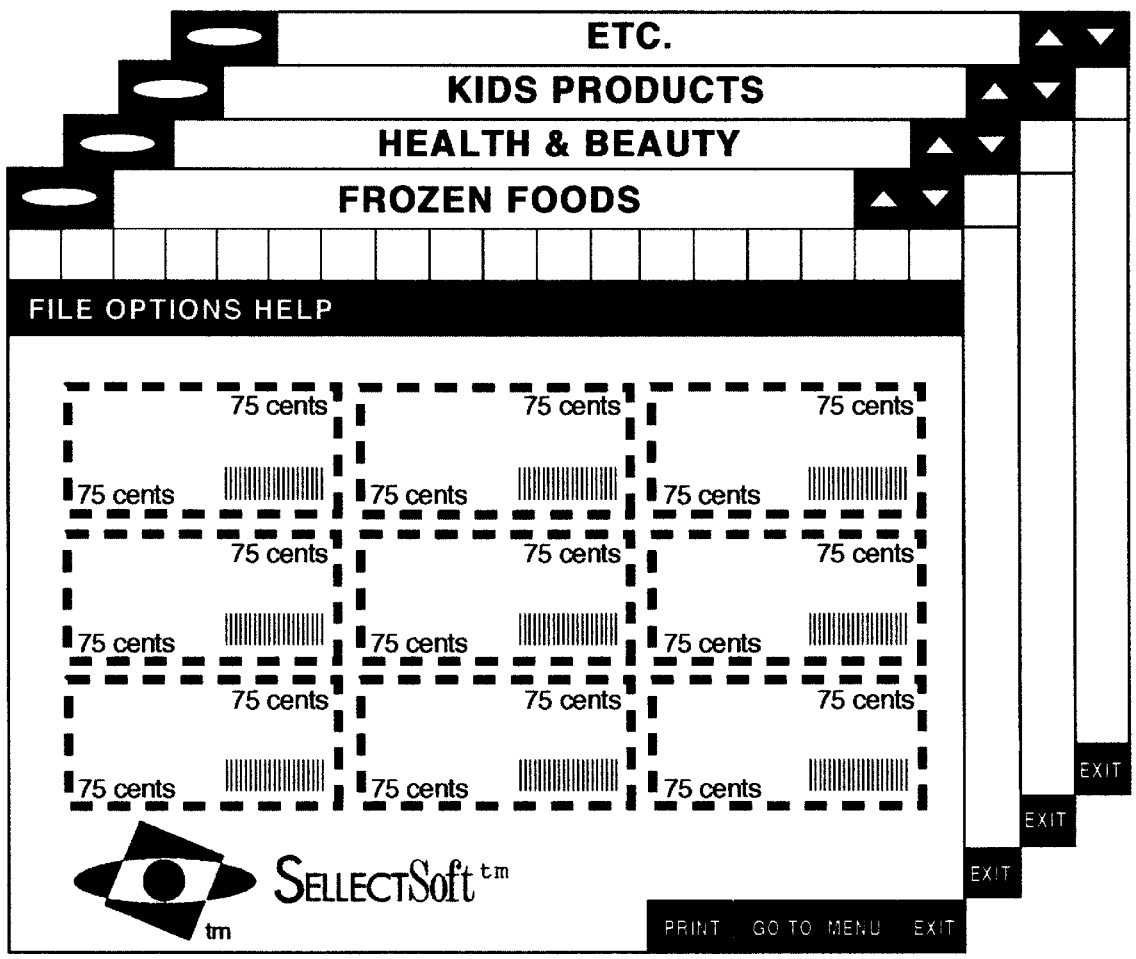
FIG. 6 is an illustration of a user display in the method and apparatus of the present invention.
Figure 14:
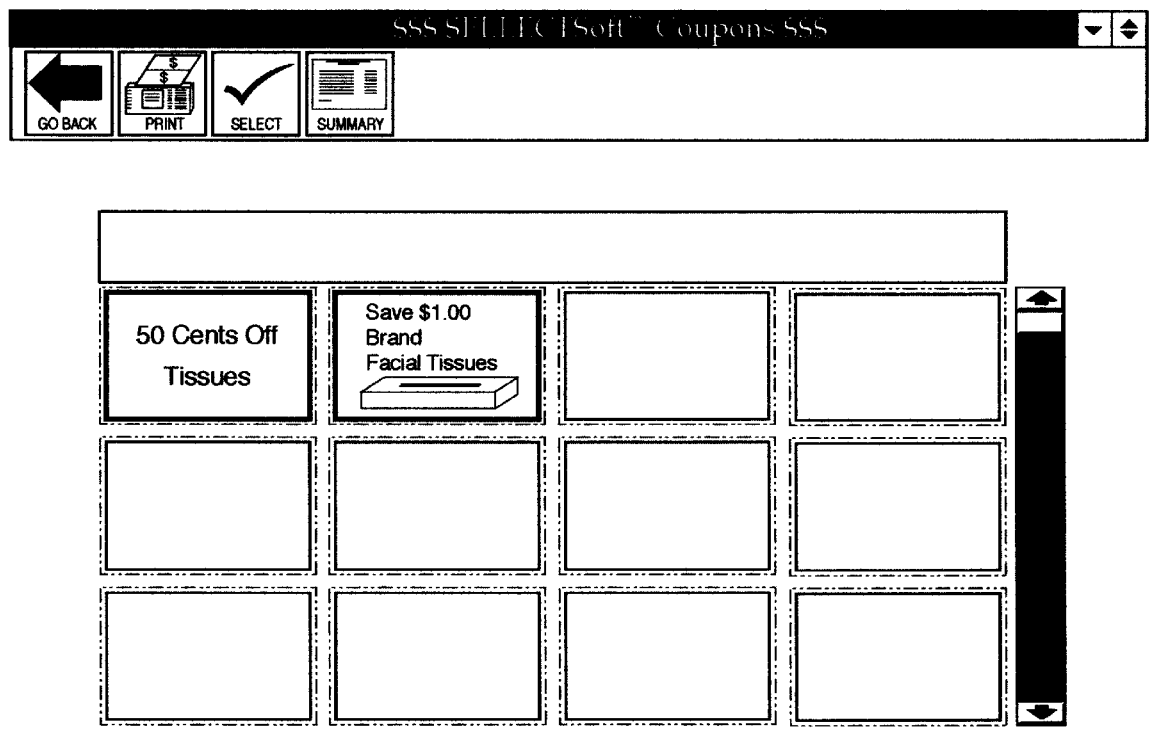
FIG. 14 illustrates a further detail of the screen of FIG. 6.

From a display Virtual Coupon™ menu, such as illustrated in FIGS. 6 and 14, a consumer may select a Virtual Coupon™ by clicking on the Virtual Coupon™ or selecting the Virtual Coupon™ using a pull-down menu or the like. Once a number of Virtual Coupons™ have been selected, the consumer may then print a list of selected Virtual Coupons™ by clicking on a print icon or selecting a print option from a pull-down menu. The coupon list may include a bar code or the like representing a particular consumer's identification number or numbers. Such a bar code may be used as a temporary frequency card for a consumer who has not previously signed up for a frequency card. Alternatively, redemption of virtual coupons using the 'temporary' frequency card may trigger a mailing of a permanent frequency card to the consumer.

Figure 7:
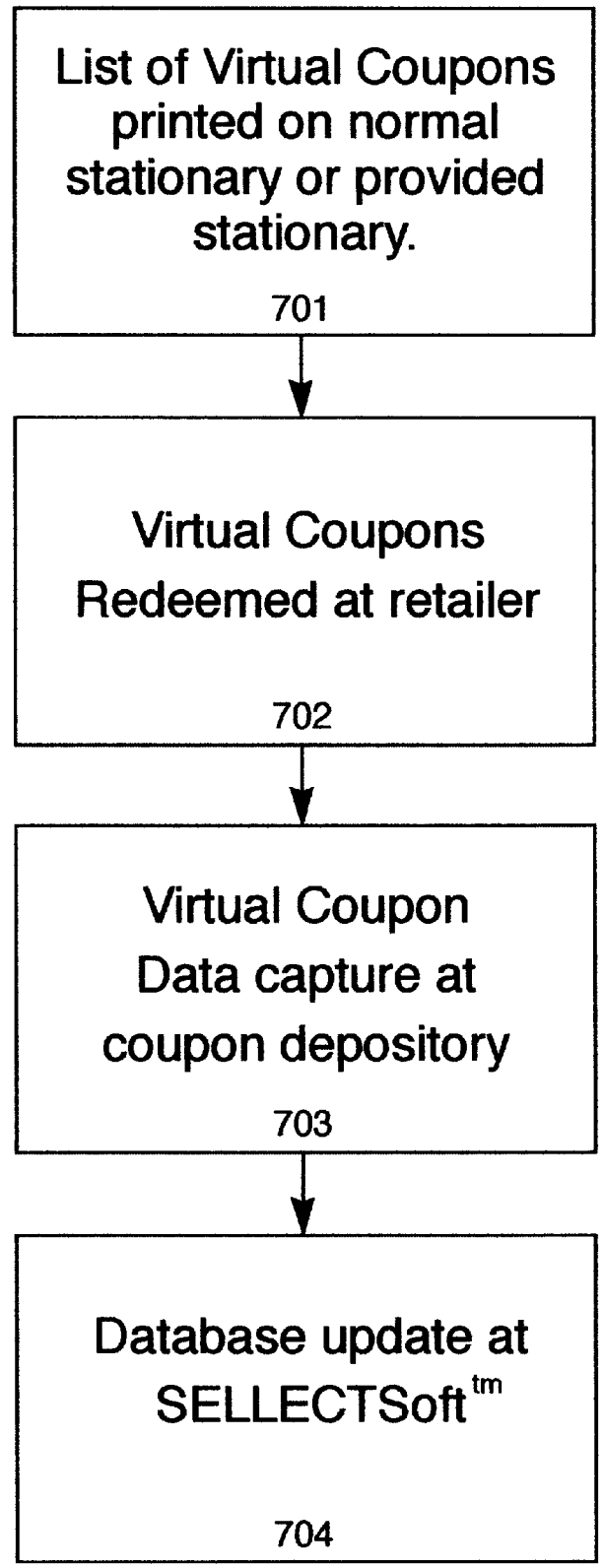
FIG. 7 is a block diagram illustrating the operation of the coupon printing operation of the present invention.

FIG. 7 illustrates the steps in printing a list of selected Virtual Coupons™. It should be noted that prior to installation of the SELLECTSOFT™ software, a suitable printer driver may be installed in the consumer's PC, either as a part of the SELLECTSOFT™ software, or as part of the Windows™ GUI. In the preferred embodiment, the SELLECTSOFT™ software may use the selected default printer driver in the Windows™ GUI as a printer driver.

Once the print command has been selected, as indicated in FIG. 7, a list of selected Virtual Coupons™ may be printed on a consumer's printer. In step 701, a list of selected Virtual Coupons™ may be printed on plain paper provided by the consumer, or may be printed on special paper provided with SELLECTSOFT™ diskette 310.

Individual Virtual Coupons™ may be stored on SELLECTSOFT™ diskette 310 as bit map data, suitably compressed for storage using compression techniques known in the art such as the LZEXPAND.DLL utilities shipped with Windows™ 3.0 or 3.1. Alternatively, Virtual Coupon™ image data may be stored as a series of bit-mapped components which may combined to generate a Virtual Coupon™ image for display or printing. For example, common border and Virtual Coupon™ redemption information need only be stored once. Product logo and other information may be stored as individual bit maps. Discount or rebate information (e.g., cents off) may be generated from numerical data using font bit maps. Bar code images may also be suitably generated in a similar manner.

A consumer may select, using a mouse or the like, individual Virtual Coupons™ for a list to be printed on a home computer printer. As each Virtual Coupon™ is selected, a savings counter, as illustrated in FIG. 12, may display total savings from individually selected Virtual Coupons™ during a particular session. Thus, the consumer can readily appreciate the overall savings provided through SELLECTSOFT™.

The list of Virtual Coupons™ may be printed in a graphics mode of a laser type printer (e.g., Hewlett-Packard™ laser jet series) Ink jet printer (e.g., Canon™ Bubblejet™ series) or high resolution dot matrix printer (e.g., 24 pin dot matrix printer) for example at 300×300 dots per inch (dpi) resolution. Alternately, the list of Virtual Coupons™ may be printed in a text mode using various printer types. In the preferred embodiment, the Virtual Coupon™ list may be provided in a graphics mode, where each Virtual Coupon™ listed may be in the form of a miniature coupon icon or the like. In addition, bar codes for selected Virtual Coupons™ may be printed as part of the Virtual Coupon™ list.

The Virtual Coupon™ list may be provided with printed indicia indicating product and discount or rebate, as well as traditional coupon redemption terms (expiration date or the like). Optional Bar codes provided on the Virtual Coupon™ list may comprise a group of bar codes identifying product, size, and redemption terms (e.g., cents off, two-for-one, or the like). This group of bar codes may be those already in use in prior art Virtual Coupons™. Thus, the Virtual Coupon™ list generated by the SELLECTSOFT™ software may be read by existing supermarket or retail store scanning or coupon redemption devices without modification to those devices.

In the preferred embodiment, however, such bar codes may not be required, and the Virtual Coupon™ list acts only as a shopping guide for the consumer to prompt the consumer to purchase selected discounted products. In conventional frequency or savings club programs, consumers may shop for products without consciously looking for discounted products. The Virtual Coupon™ list of the present invention provides an incentive for the consumer to shop for particular items for which Virtual Coupons™ have been generated.

The coupon list may be provided, however, with a bar code or other computer-readable indicia corresponding to a consumer's code number or numbers. Thus, if a consumer has not previously signed up for a store's frequency card program, the consumer may use the coupon list as a 'temporary' frequency card. The bar code may be scanned at check-out and read by a store computer to apply virtual coupon discounts. If the consumer has not already requested a frequency card, the act of scanning the consumer bar code at check-out may trigger a mailing of a frequency card to the consumer.

To prevent coupon fraud, when each discounted product is purchased, an individual consumer's Virtual Coupon™ database may be updated to reflect that a Virtual Coupon™ has been redeemed. An individual consumer's Virtual Coupon™ database may allow for one, two, or more redemptions of a particular Virtual Coupon™ value before such Virtual Coupon™ has expired. Moreover, an individual consumer's Virtual Coupon™ database may automatically "expire" Virtual Coupons™ upon a predetermined expiration date or at the end of a predetermined expiration period.

As no paper coupons are exchanged, coupon replication and fraud, either by consumers or retailers is virtually eliminated. As each Virtual Coupon™ redemption may be tied to a particular consumer's Virtual Coupon™ database, fraudulent redemption, even on an electronic level (e.g., by computer hacking or the like) may be difficult and time consuming and more readily detected.

To prevent consumers from merely using the frequency card as a way of obtaining windfall savings, Virtual Couponing™ may be provided with a feedback mechanism to encourage the consumer to make conscious coupon purchase choices. As noted above, bar codes may be provided on the Virtual Coupon™ list such that a consumer must present such a list to a cashier at checkout to receive Virtual Coupon™ discounts.

In an on-line embodiment (e.g., BBS, Internet, or the like) a consumer may provide coupon feedback information via an on-line connection to enable Virtual Coupon™ discounts within an individual consumer's Virtual Coupon™ database. By encouraging a consumer to enable individual Virtual Coupons™, the consumer is encouraged to shop for those particular items, rather then merely collect such discounts as a windfall. In-store computer kiosks may be provided to allow a consumer to log into his or her Virtual Coupon™ account (e.g., by inserting the SELLECTSOFT™ diskette) to check on available Virtual Coupon™ discounts, print a shopping list, and select Virtual Coupons™ for redemption.

In step 702, the consumer may redeem Virtual Coupon™ (s) at a retailer by purchasing the discounted product. As noted above, the Virtual Coupon™ discount may be automatically applied to the consumer's total at the checkout by use of the frequency card, or a consumer bar coded list may be used to indicate which Virtual Coupon™ discounts are to be applied. Once used, the list may be discarded, and thus no paper coupons need be retained. Moreover, as each Virtual Coupon™ is checked against an individual consumer's Virtual Coupon™ database (via frequency card), opportunities for in-house staff to fraudulently redeem coupons is diminished.

It should be noted that the SELLECTSOFT™ software may allow for only a limited number of redemptions a particular Virtual Coupon™. As discussed above, Virtual Coupons™ may generally be used only for promotional purposes to introduce consumers to new products or to induce future sales of a product. A product manufacturer may not want to have large portions of sales occur at Virtual Coupon™ prices, however. Thus, after a predetermined number of redemptions, an individual Virtual Coupon™ selection may disappear from the SELLECTSOFT™ software menu and redemption of such Virtual Coupons™ may be blocked.

Once redeemed at the retailer, data from Virtual Coupons™ may be stored in a store computer and uploaded to a coupon depository for further redemption and processing. In step 703, at the coupon depository, Virtual Coupon™ redemption data such as product information data and consumer ID may be captured and sorted to update a consumer database. From this data, it may be determined exactly which consumers purchased which particular products and from which retailers. Such data may have a high degree of accuracy as compared to previous tracking techniques.

From this marketing data, the consumer database may be updated as illustrated in step 704. The consumer database may contain specific information as to quantities and selections of products purchased by a consumer, as well as more general information as to types of products purchased. From this information, a new SELLECTSOFT™ diskette 310 (or new virtual coupon™ data) may be prepared for each selected consumer, tailored to the demographics and demonstrated buying habits of the consumer.

For example, if an initial SELLECTSOFT™ diskette 310 mailed to a consumer contains various pet product Virtual Coupons™ (e.g., dog food, cat food, or the like), and several of these are subsequently redeemed, it may be inferred that the consumer is a pet owner. In future mailings, additional pet product Virtual Coupons™ may be included, or alternately, such Virtual Coupons™ may be more narrowly targeted (e.g., to dog products only or cat products only) depending upon the buying preferences of the consumer.

If the consumer redeems no Virtual Coupons™ from a given category, such Virtual Coupons™ may be de-emphasized until the consumer's buying habits change. For example, if a given consumer uses no baby or child product Virtual Coupons™, such categories may be de-emphasized. If a consumer starts redeeming such Virtual Coupons™, then it may be inferred that the consumer has started a family, and Virtual Coupons™ targeted toward family needs may then be included in a consumer's subsequent mailings.

Other techniques for distributing Virtual Coupons™ and retrieving data may be utilized within the spirit and scope of the present invention. For example, on-line services or the like may be utilized to download or upload data. A user may receive an initial SELLECTSOFT™ diskette 310 in the mail or download an initial package of program data from an on-line service or through 1-800 modem dialup or through CD-ROM or the like. Subsequent "packages" of Virtual Coupons™ may then be downloaded to a consumer's computer through on-line services or 1-800 modem dialup. Virtual Coupon™ printing information may be uploaded via such on-line services to provide marketing data, however, it is believed that such printing data may not be as accurate as redemption data, as redemption data indicates a definite sale of a product.

In an alternative embodiment of the present invention, a so-called "smart card" may be utilized for a consumer frequency card. Smart cards generally comprise a plastic credit-type card with an embedded silicon chip, typically a memory array, although logic circuits and even microprocessors may be embedded in a smart card. Smart cards have been used in Europe for banking purposes and in the United States for satellite decryption systems (See, e.g., Gammie et. al., U.S. Pat. No. 5,029,20, issued Jul. 2nd, 1991, entitled "External Security Module for a Television Signal Decoder" incorporated herein by reference).

The enhanced memory storage abilities of smart cards may be applied in an alternative embodiment of the present invention as a frequency card to store all or a portion of Virtual Coupon™ data. In addition to storing consumer information, a smart card frequency card may also be used to store Virtual Coupon™ information. A smart card interface device, coupled to a consumer's computer, may be used to download Virtual Coupon™ data onto a consumer's smart card frequency card. To serve consumers without a smart card interface device, a public computer kiosk or other type of machine (e.g., automated teller or the like) may be used to download Virtual Coupon™ data. As such smart cards may be in widespread use in coming years, implementation of such an embodiment may be met with little resistance from consumers.

At checkout, a consumer's smart card frequency card may be read by a smart card interface provided coupled to a checkout register. Virtual Coupon™ data may be read from a consumer's smart card, and may be checked against a consumer's Virtual Coupon™ database to prevent against fraud. Once redeemed, the Virtual Coupon™ data may be deleted (or marked redeemed) on the consumer's smart card frequency card. Similarly, the consumer's individual Virtual Coupon™ database may be marked. Thus, a given Virtual Coupon™ may be redeemed only once or a predetermined number of times.

Referring back to FIG. 5, a second portion of the SELLECTSOFT™ process will now be described. As illustrated in FIGS. 4, 6, and 7, a consumer may print out a list of selected Virtual Coupons™ once a validation number has been received. Virtual Coupons™ may be redeemed at a retailer, as illustrated in step 510 and discussed in step 702 in FIG. 7.

Figure 1:
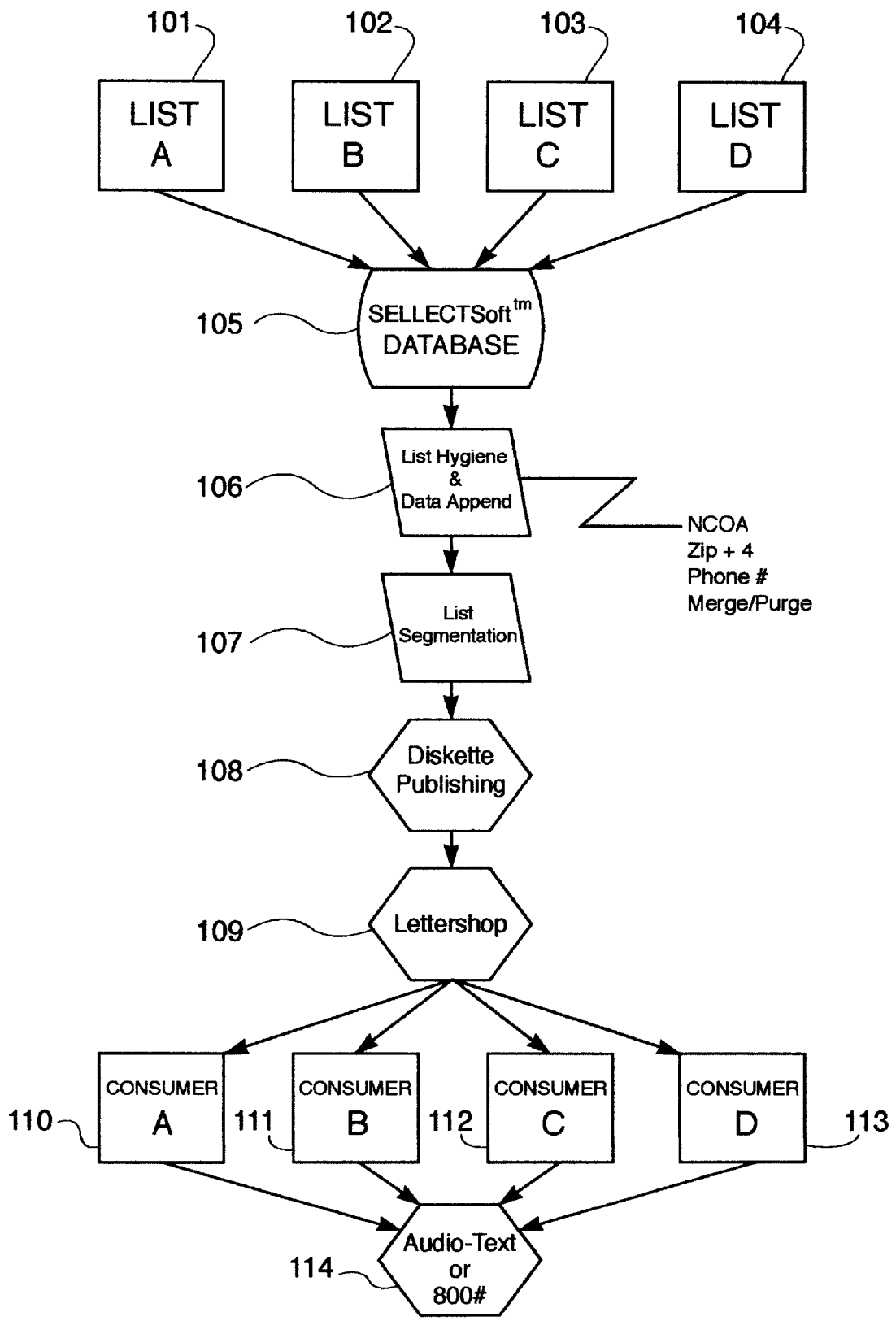
FIG. 1 is a first portion of a flowchart illustrating the operation of the apparatus and method of the present invention.
Figure 2:
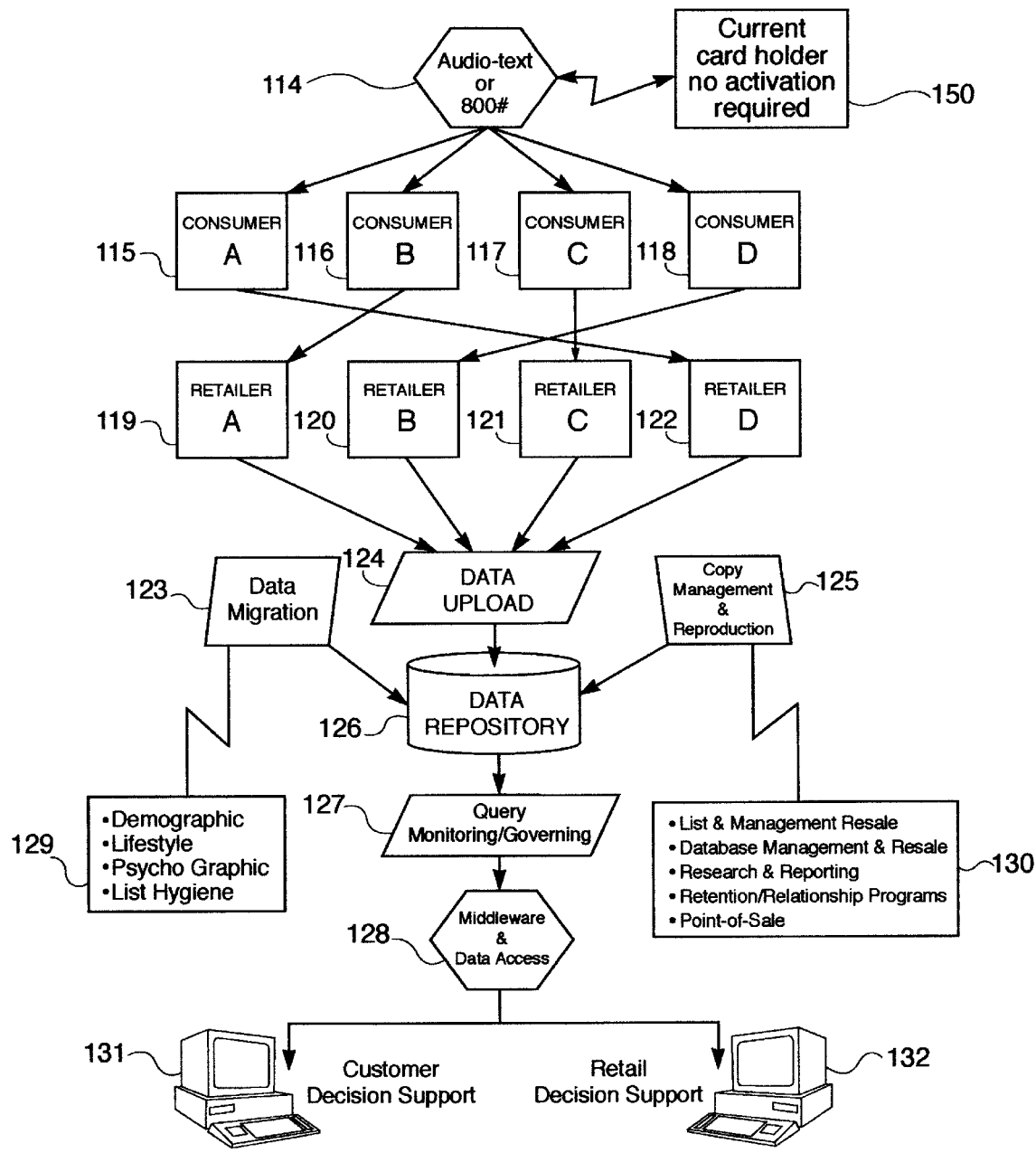
FIG. 2 is a second portion of a flowchart illustrating the operation of the apparatus and method of the present invention.

The retailer may redeem the Virtual Coupon™ in one of several ways. In the preferred embodiment, the retailer need not redeem the Virtual Coupon™ per se, and the process is entirely automatic. When the consumer reaches the checkout line, he or she presents items for purchase. When items are rung up, the consumer presents his or her frequency card, which may be scanned or read. The store computer system reads a consumer's Virtual Coupon™ database and applies Virtual Coupon™ discounts for applicable purchased products. In addition a consumer's Virtual Coupon™ database may be appended to indicate that the consumer has redeemed that Virtual Coupon™ value. Thus, a consumer may redeem a particular Virtual Coupon™ value only once, or a limited number of times, before that Virtual Coupon™ value expires From the understanding of the invention described above in connection with FIGS. 3, 4, 5, 6, and 7, a more detailed description of the invention will now be provided in connection with the flowchart of FIGS. 1 and 2. FIGS. 1 and 2 are a combined flowchart illustrating the SELLECTSOFT™ Virtual Couponing™ technique in more detail. In addition, the flowchart of FIGS. 1 and 2 further illustrate how marketing data may be generated and exploited using the SELLECTSOFT™ Virtual Couponing™ techniques. FIG. 1 is a flowchart illustrating a first portion of the steps in the SELLECTSOFT™ electronic Virtual Coupon™ distribution system.

As illustrated in FIG. 1, consumer mailing LIST A 101, LIST B 102, LIST C 103, and LIST D 104 may be combined to form an initial SELLECTSOFT™ database 105. Any number of lists may be combined to form SELLECTSOFT™ database 105, and in addition, additional list information may be later added to SELLECTSOFT™ database 105 as time progresses. Examples of suitable mailing and/or consumer lists 101–104 may comprise, for example, list identifying consumers with household computers. Lists 101–104 may originate from multiple sources (e.g., computer magazine subscription lists, commercial mailing list services, or the like) typically used for database development, direct mail, and telemarketing or the like. Moreover, lists 101–104 may be obtained from a list of customers participating in one or more frequency card programs.

Combined, these lists may be used to append and/or form SELLECTSOFT™ database 105. In addition to consumer name and address information, SELLECTSOFT™ database 105 may be revised, as will be further discussed below, to include additional information about each consumer. Examples of such additional information include activation/validation information and demographic information retrieved during the 1-800 validation discussed above. Moreover, individual Virtual Coupon™ redemption information may also be added to SELLECTSOFT™ database 105.

A risk/fraud score may be added to SELLECTSOFT™ database 105 from information gathered during the activation call. This score may be based upon a number of criteria, for example, whether a consumer's ANI matches the number in the database for that consumer or whether a consumer's address, name or other basic information match the information in the SELLECTSOFT™ database. Corresponding risk/fraud scores may be assigned to each consumer based upon such criteria. Depending upon a consumer's risk/fraud score, a validation number may or may not be given to a consumer. If the risk/fraud score is high, a validation number may be denied and a new SELLECTSOFT™ diskette 310 mailed to the consumer. Thus, for example, the use of false names or addresses or the like may be eliminated or reduced.

In addition, consumers with high risk/fraud scores (as well as a random sampling of other consumers) may be later selectively monitored for Virtual Coupon™ fraud. Thus, the need to monitor all consumers within SELLECTSOFT™ database may be eliminated or reduced.

In step 106, SELLECTSOFT™ database 105 may be further passed though a list hygiene/data append step. In step 106, the combined lists 101–104 may be cross checked to reduce or eliminate redundant entries. For example, variations of the same consumer name may be combined into one entry. Thus, for example, a consumer name entered several times as "R. BELL", "R. P. BELL", "ROBERT BELL", or "BOB BELL" may be combined into one data entry such that the consumer does not receive multiple SELLECTSOFT™ diskettes.

In addition, a cross-reference to the database phone number and/or address may be used to determine if a prior diskette was sent the same address. Thus, for example, multiple consumers at the same household having slightly different addresses may not receive multiple copies of SELLECTSOFT™.

In addition, in step 106, Zip+4 postal codes may be added to addresses to further speed processing of mailings and/or qualify for reduced postal rates. Moreover, the postal service NCOA (national change of address) file may be cross-referenced with data in SELLECTSOFT™ database 105 to provide new consumer addresses or to eliminate redundant mailings to the same consumer at multiple addresses.

In step 107, SELLECTSOFT™ database 105 may be segmented into various lists based upon consumer buying habits (from demographic information) regionality, and/or other product manufacturers specifications. For example, for a regional mailing of SELLECTSOFT™ diskette 310, it may be desirable to segment SELLECTSOFT™ database 105 into a list for a particular region (e.g., mid-Atlantic region, metropolitan Washington D.C. region). Such segmentation may be made on a zip code, state or other basis. Using zip codes it may be possible to segment a list to a particular individual neighborhood.

Moreover, other demographic information may be used to segment SELLECTSOFT™ database 105, such as annual income, or computer type. For example, in an initial release, SELLECTSOFT™ software may be limited to a Windows™ GUI environment. Thus, it may be desirable to segment SELLECTSOFT™ database, at least initially, to target Windows™ users. Other segmented lists may be then prepared to target users of other operating systems (e.g., MS-DOS™, MacIntosh™, or the like) to provide such users with appropriately formatted SELLECTSOFT™ software.

Once a target list has been generated, SELLECTSOFT™ diskettes 310 may be published as illustrated in step 108. Manufacturer Virtual Coupons™ may then be entered into a SELLECTSOFT™ master mailer diskette utilizing a proprietary build process. Each SELLECTSOFT™ diskette 310 mailed on a given mailing campaign may contain identical Virtual Coupon™ information, thus simplifying diskette reproduction. List segmentation may be utilized to group consumers into mailing campaign groups such that diskettes tailored toward particular consumer demographic profiles may be produced in one batch.

A label affixed to each SELLECTSOFT™ diskette 310 may denote a unique SELLECTSOFT™ serial number for that diskette, along with address, phone number, and consumer name, as indicated in FIG. 3. The serial number of the diskette may be later used by the consumer in the validation process as discussed below.

In step 109, SELLECTSOFT™ diskettes 310 may then be inserted into mailers and mass mailed to consumers A, B, C, & D (110, 111, 112, and 113). For the purposes of illustration, four consumers A,B,C, & D (110, 111, 112, and 113) are shown. However, it may be appreciated that the number of consumers in a given mailing will be considerably larger.

In step 114, consumers A, B, C, & D (110, 111, 112, and 113) may call an audio-text or 1-800 number (or modem connection) to provide further demographic data, confirm name and address, and receive validation information, in the manner discussed above in connection with FIG. 5.

Note that although FIG. 1 illustrates each consumer A, B, C, & D (110, 111, 112, and 113) receiving validation via the 1-800 number, it is presumed that for a given campaign, a certain percentage of consumers may fail to respond. For example, some targeted consumers may not have a computer, despite demographic data to the contrary. Alternately, a consumer may not be interested in SELLECTSOFT™ or SELLECTSOFT™ diskette 310 may have been lost or misdirected in the mail.

For those consumers who fail to respond to a mailing, follow-up telemarketing calls may be made to determine why the consumer failed to respond. The SELLECTSOFT™ database may then be adjusted to either eliminate that consumer name, or modify future mailings in response to consumer comments, data, and the like. Note that as opposed to prior art paper Virtual Couponing™ techniques, the SELLECTSOFT™ system allows for more careful tracking of which consumers open the Virtual Coupon™ mailing, which consumers redeem Virtual Couponsm, and which consumers take no interest whatsoever. In contrast, conventional paper Virtual Couponing™ techniques may only provide information as to what percentage of Virtual Coupons™ from a given campaign have been redeemed.

FIG. 2 is a flowchart illustrating a further portion of the steps in the SELLECTSOFT™ electronic Virtual Coupon™ distribution system. Again, as with FIG. 1, this portion of the detail flowchart illustrates the steps shown in FIG. 5 in more detail.

As illustrated in FIG. 2, from step 114, each consumer A, B, C, & D (110, 111, 112, and 113) may then receive an authorization or validation number after providing demographic and proof of identification information. It should be noted that step 114 may not be required for SELLECTSOFT™ diskettes subsequently mailed to the same consumer 110–113, as demographic information and authorization data may already have been exchanged. In step 150, if it is determined whether consumer 110–113 already has a frequency card. If consumer 110–113 already has been provided with a frequency card, no activation may be required and the process may pass to the next step, if consumer 110–113 does not presently have a frequency card, one may be applied for on the phone, and an "instant" frequency card generated for the consumer, as discussed below.

Each consumer A, B, C, & D (110, 111, 112, and 113) may then print out a list of selected Virtual Coupons as discussed above in connection with FIG. 7 and take such a list of Virtual Coupons™ to retailer A, B, C, or D (119, 120, 121, or 122). The Virtual Coupon™ list may include a consumer identification number encoded as a bar code. Such a bar code may be scanned by existing checkout scanning equipment to read the consumer identification number. If a consumer has been assigned an instant frequency card by telephone application, the bar code printed on the coupon list may serve as that temporary frequency card ID.

As illustrated in FIG. 2, each consumer A, B, C, & D (110, 111, 112, and 113) make take the list of Virtual Coupons™ to any of retailers A, B, C, or D (119, 120, 121, or 122) or multiple retailers. For the purposes of illustration, only four retailers A, B, C, or D (119, 120, 121, or 122) are illustrated here. However, it can be appreciated that the number of retailers may be significantly greater.

Upon checkout at retailers 119–122, consumer ID data may be captured at the point of sale (POS) using scanning equipment as discussed above, or my magnetically reading a frequency card, or the like. Such techniques may be used where such equipment is already in service and thus significant modifications to a retailer's hardware may not be necessary. Alternately, new scanning hardware and/or software may be incorporated into retail bar code scanning equipment to capture and upload SELLECTSOFT™ consumer ID, marketing and/or Virtual Coupon™ data.

In step 124, retailers A, B, C or D (119, 120, 121, or 122) may upload data relating to redemption of SELLECTSOFT™ Virtual Coupons™, along with other marketing information (e.g., products purchased) into data depository 126. From data repository 126, queries may be made, as illustrated in step 127 to determine which consumers are purchasing which products using SELLECTSOFT™ Virtual Coupons™. In order to provide marketing data to retailers, product manufacturers and the like, a data access mechanism 128 may be provided to allow queries to be made to the SELLECTSOFT™ database via modem dialup, on-line service, or the like.

As illustrated in FIG. 2, the SELLECTSOFT™ database repository 126 may receive additional consumer information through data migration step 123. As illustrated in step 129, additional consumer data may include demographic data received from other sources, lifestyle and psycho graphic information. In addition, list hygiene functions may be performed, as discussed above in connection with FIG. 5 to eliminate redundant entries and update consumer information.

The SELLECTSOFT™ database repository 126 may be utilized to redeem Virtual Coupons™ in real time at a retail location during checkout. A UPC product code may be scanned electronically during checkout, and data from the SELLECTSOFT™ database may be reviewed to determine whether such a product is eligible for Virtual Coupon™ discount redemption. If a consumer attempts to redeem too many of a particular Virtual Coupon™, authorization to redeem such Virtual Coupons™ may be denied.

As illustrated in Step 125, SELLECTSOFT™ data may be managed for further distribution or resale. As noted earlier, accurate demographic information is highly valuable to marketing groups, retailers, and product manufacturers. As illustrated in step 130, SELLECTSOFT™ mailing lists may be resold (list & management resale) or database information may be resold (database management & resale). Alternately, aggregate data (research and reporting) may be sold, indicating consumer trends or the like. Retention/Relationship Programs may be generated (e.g., club or membership card or the like) from SELLECTSOFT™ data, and/or point of sale data promotions may be created.

Retailers 132 may access the SELLECTSOFT™ database to determine which products in their region or demographic mix may be popular or may need further promotion. Product manufacturers, marketers, and the like 131 may also use the SELLECTSOFT™ database to determine product sales versus demographic data or the like. The Query monitoring/governing software 127 may allow retailer 132 or product manufacturer 131 to produce a number of queries on SELLECTSOFT™ data based on any combination of criteria stored in the SELLECTSOFT™ database. Query monitoring/governing software 127 may meter such queries on a cost per query or on-line connect time basis so that retailers 132 of product manufacturers 131 may be charged for such data queries. Further, query monitoring/governing software 127 may be provided with lockout or security features to prevent unauthorized access to an individual consumer's file so as to prevent unnecessary invasion of privacy.

Although discussed above in terms of diskette storage and mailing, it should be appreciated that other techniques for distribution and authorization may be utilized within the spirit and scope of the present invention. Virtual Coupon™ data may be transmitted via Internet or Internet World Wide Web (WWW) or through on-line services or on-line services providing access to the Internet. Similarly, dialup access may be provided via modem or the like.

Moreover, SELLECTSOFT™ diskette 310 may be substituted with other types of data storage media, including but not limited to CD-ROM, smart card, flash EPROM, PCMCIA card, or the like. CD-ROMs in particular may provide additional storage capacity to store a large number of Virtual Coupons™ and/or advertising and promotional materials including so-called multimedia displays or the like (e.g., video advertisements).

Figure 8:
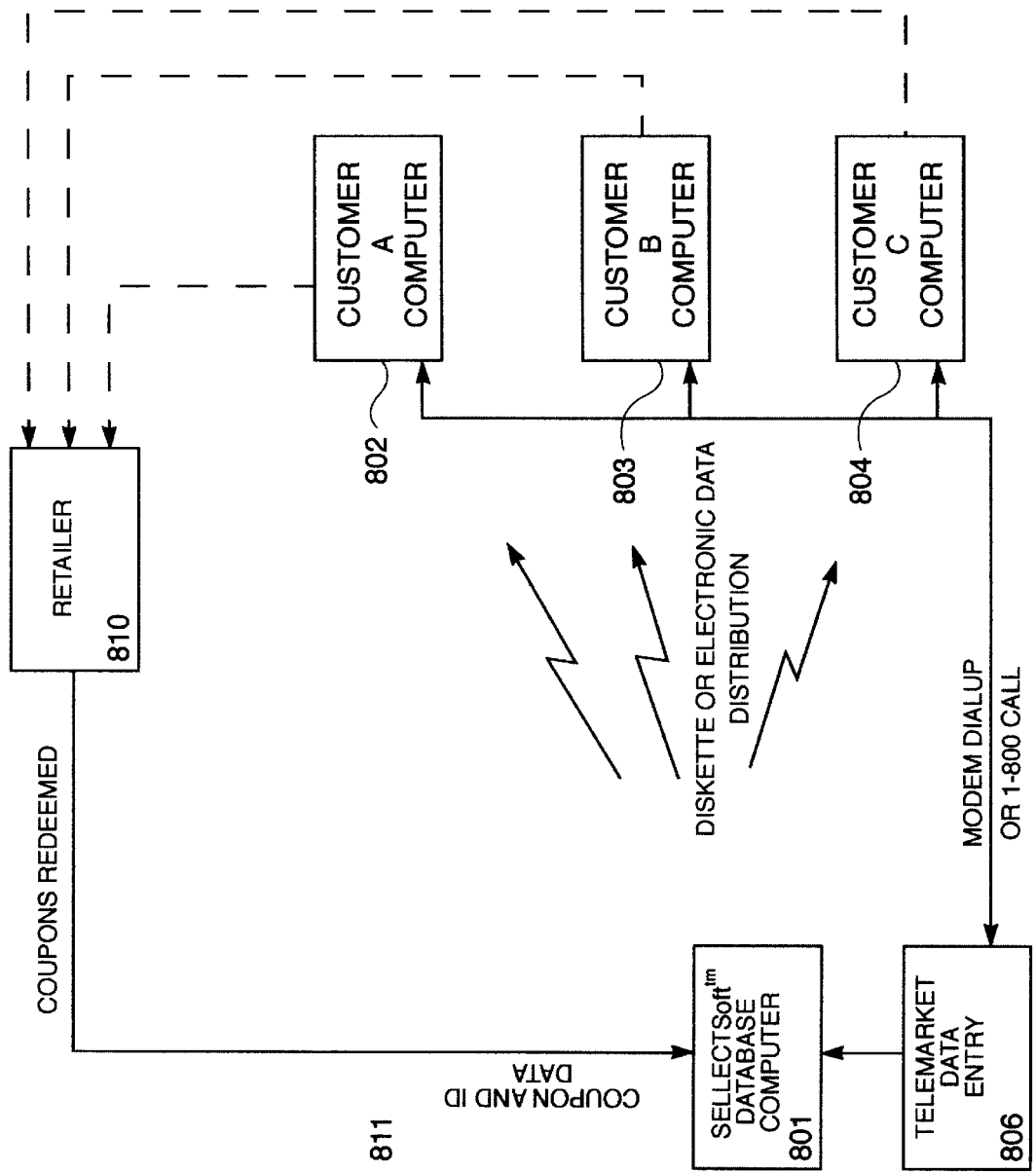
FIG. 8 is a block diagram of illustrating the operation of the system and method of the present invention.

FIG. 8 illustrates the flow of data from the various computers used in the present invention. As illustrated in FIG. 8, SELLECTSOFT™ database computer 801 may generate a package of Virtual Coupon™ data for distribution to consumer computer 803–804. SELLECTSOFT™ database computer may comprise a computer, computers, or network of computers or the like. The package of Virtual Coupon™ data may be distributed to consumer computers 802–804 via mailing of diskette as discussed above, or by other means (e.g., modem dialup, Internet, on-line service, ISDN, or other data transmission scheme).

Consumer computers 802–804 may typically comprise a home computer, PC or the like, such as an IBM™ compatible PC capable of running Windows™ software. Consumer computers 802–804 may receive demographic and/or identification data from respective consumers and communicate such data to SELLECTSOFT™ database computer 801 vial telemarketing data entry 806. Alternately, demographic and/or identification data may be communicated verbally via a 1-800 call as discussed above. In response, to transmission of demographic and/or identification data, validation data may be transmitted to consumer computers 802–804 to allow for printing of a list of Virtual Coupons™ from the package of Virtual Coupon™ information.

Virtual Coupon™ redemption data may be transmitted back to the SELLECTSOFT™ database computer 811 when Virtual Coupons™ are redeemed at retailer 810. Virtual Coupon™ data may be electronically transmitted from retailer 810 to SELLECTSOFT database computer 801. Note that data generated in the SELLECTSOFT™ system may be fed-back to the SELLECTSOFT database computer 801. This feed-back technique provides for increased marketing and demographic data accuracy and further reduces instances of fraud or abuse of Virtual Coupons™.

Figure 9:
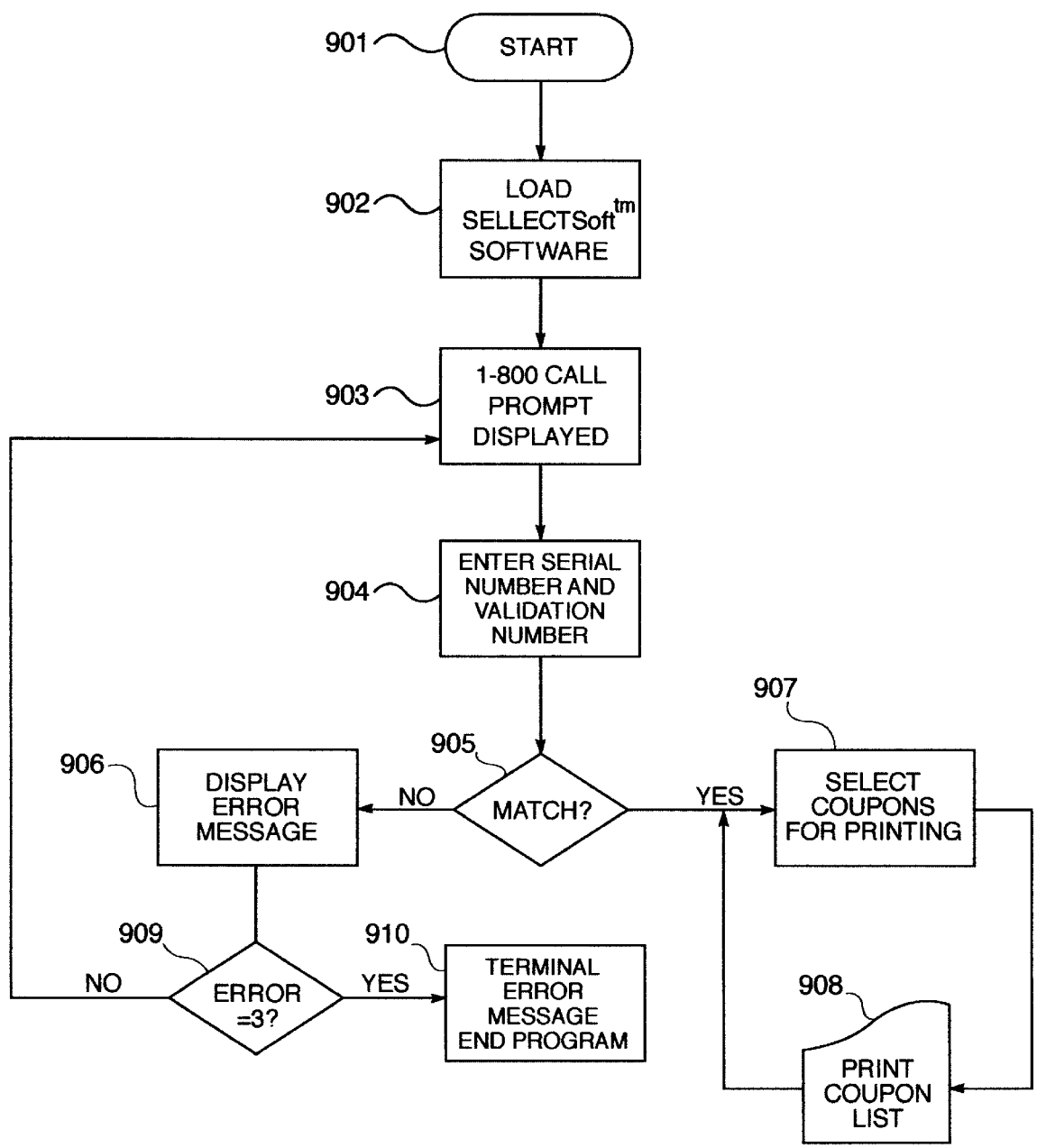
FIG. 9 is a flowchart illustrating the operation of the consumer software portion of the present invention.

FIG. 9 is a simplified diagram illustrating the step in the operation of the SELLECTSOFT™ software in a consumer's computer. As illustrated in FIG. 9, the process starts at START step 901. At step 902, the consumer loads the SELLECTSOFT™ software into his or her computer memory and executes the program. In step 903, a screen may prompt the consumer to call a 1-800 voice or audiotext number to provide demographic and identification information and receive a validation number. As part of the validation process, the consumer may provide the serial number of the SELLECTSOFT™ diskette to the 1-800 operator or audiotext system.

In step 904, a validation number provided by the 1-800 operator or audiotext system may be entered into the consumer's computer, along with name and address information and the SELLECTSOFT™ diskette 310 serial number, as illustrated in FIG. 11. The validation number may then be combined with the SELLECTSOFT™ serial number to produce a code number. This unique code number may then be compared with a code number stored on the SELLECTSOFT™ diskette as illustrated in step 905. If a match occurs, processing passes to step 907 and a consumer may select Virtual Coupons™ for printing. A list of Virtual Coupons™ may then be printed as illustrated in step 908. When the list of Virtual Coupons™ has been printed, the consumer may return to step 907 to select additional Virtual Coupons™, or terminate the program.

If the code numbers do not match, as determined in step 905, processing passes to step 906 and an error message is displayed. In step 909, a determination is made whether a predetermined number of errors have occurred (e.g., 3). If more than the predetermined number of errors have occurred, processing may be halted and an additional error message displayed as illustrated in step 910. Otherwise, processing may return to step 903 and the consumer may again be prompted to call the 1-800 number. This retry scheme may allow for user mishap while preventing an unlimited number of retrys to reduce or prevent fraud.

While the preferred embodiment and various alternative embodiments of the invention have been disclosed and described in detail herein, it may be apparent to those skilled in the art that various changes in form and detail may be made therein without departing from the spirit and scope thereof.

What is claimed is:

1. A series of operational steps to be performed with the aid of a computer for distributing and generating virtual coupons, comprising the steps of:

generating in a first computer a database comprising at least a list of consumer names and addresses, generating in the first computer a package of data for a selected group of consumers from the list, the package of data including at least one virtual coupon data, transmitting from the first computer the package of data to computers of the selected group of consumers from the list, entering, in the first computer, demographic and identification data received from a consumer from the selected group of consumers, transmitting to a computer of the consumer a validation code so as to allow the computer of the consumer to display at least one virtual coupon from the at least one virtual coupon data in the package of data, printing, from the computer of the consumer, in response to a command input by a consumer, a list including said at least one virtual coupon from the at least one virtual coupon data in the package of data, generating, in the first computer, redemption data in response to a consumer purchase of a product corresponding to the at least one virtual coupon, and updating, in the first computer, the database from redemption data to indicate whether a consumer has redeemed the at least one virtual coupon.

2. The series of operation steps of claim 1, wherein said step of transmitting from the first computer the package of data to computers of the selected group of consumers from the list further comprises the substeps of:

generating a plurality of diskettes each containing the package of data, and loading the package of data from one of the plurality of diskettes to a computer of a consumer of the selected group of consumers.

3. The series of operation steps of claim 1, wherein said step of transmitting from the first computer the package of data to computers of the selected group of consumers from the list further comprises the substep of:

downloading, over a computer network, the package of data to a computer of a consumer.

4. The series of operation steps of claim 1, further comprising the steps of:

counting in the first computer, a number of times a consumer has redeemed a particular virtual coupon, and indicating fraud if the number of times said particular virtual coupon is redeemed by the consumer exceeds a predetermined amount.

5. The series of operation steps of claim 1, wherein the consumer identification number is imprinted on the list with a bar code, said series of operation steps further comprising the steps of:

reading the consumer identification number bar code from the list using a scanning device, and outputting the read consumer identification number to the database in the first computer.

6. The series of operation steps of claim 1, wherein said step of generating, in the first computer, redemption data further comprises the steps of:

scanning a product bar code from a product to read product data, reading a virtual coupon database for a consumer in the first computer to detect the presence of the product data, retrieving virtual coupon redemption data from the virtual coupon database if the presence of the product data is detected in the virtual coupon database, said virtual coupon redemption data including a coupon discount value, applying the coupon discount value to a purchase price of the product, and generating data indicating that a corresponding virtual coupon value has been redeemed.

7. The series of operation steps of claim 1, further comprising the steps of:

generating, in the first computer, in response to information retrieved from said updating step to indicate whether a consumer has redeemed the at least one virtual coupon, a revised database comprising at least a revised list of consumer names and addresses of who have redeemed at least a predetermined number of said at least one virtual coupon, generating, in the first computers a revised package of data for a revised selected group of consumers from the revised list, the revised package of data including at least one virtual coupon data; and transmitting from the first computer the revised package of data to computers of the revised selected group of consumers from the revised list.

8. The series of operation steps of claim 1, further comprising the steps of:

comparing, in the first computer, the demographic and identification data received from at consumer with corresponding demographic and identification data from the list of consumer names and addresses, generating, in the first computer, a risk score based upon correspondence between demographic and identification data and received from a consumer with corresponding demographic and identification data from the list of consumer names and addresses, and transmitting a validation code to the computer of the consumer if the risk score is greater than a predetermined value.

9. A computer-readable memory for directing a computer to function in a particular manner when used by the computer, comprising:

a first portion for storing virtual coupon image data in a compressed format;

a second portion for directing the computer to prompt a consumer to contact a virtual coupon distributor to receive a validation code;

a third portion for directing the computer to receive as input from a consumer a validation code;

a fourth portion for directing the computer to compare an authorization code with a stored code; and a fifth portion for directing the computer to print stored virtual coupon images if the authorization code and stored codes match.

10. The computer-readable memory of claim 9, wherein said fifth portion further comprises:

a sixth portion for directing the computer to display stored virtual coupon images;

a seventh portion for directing the computer to allow input from the consumer to select one or more of the displayed virtual coupon images; and an eighth portion for directing the computer to print a list of selected displayed virtual coupon images.

11. The computer-readable memory of claim 9, further comprising:

a ninth portion for receiving as input from a consumer a unique serial number and for combining the unique serial number with the validation code to produce an authorization code.

12. The computer-readable memory of claim 10, wherein said eighth portion further comprises:

a tenth portion for directing the computer to print a consumer identification number on the list of selected virtual coupon images.

13. A system for distributing and generating and redeeming virtual coupons and generating virtual coupon redemption and marketing data, comprising:

a first computer including a database comprising at least a list of consumer names and addresses for generating a package of virtual coupon data for a selected group of consumers from the list, the package of virtual coupon data including at least one virtual coupon;

first transmitting means, for transmitting from the first computer the package of virtual coupon data to computers of the selected group of consumers form the list;

data entry means, for entering in the first computer demographic and identification data received from a consumer form the selected group of consumers;

second transmitting means, for transmitting from the first computer to a computer of the consumer a validation code so as to allow the computer of the consumer to display at least one virtual coupon from the package of virtual coupon data;

first generating means, for printing from the computer of the consumer, in response to a command input by a consumer, a list including at least one virtual coupon from the package of virtual coupon data, the at least one virtual coupon including at least a consumer identification number; and processing means, coupled to the first computer, for receiving consumer product purchasing information, comparing the consumer purchasing information with the package of virtual coupon data, and applying a corresponding product and generating redemption data indicating a corresponding virtual coupon has been redeemed, wherein the first computer updates the database form information retrieved form the processing means indicating whether a consumer has redeemed the virtual coupon.

14. The system of claim 13, wherein said first transmitting means further comprises means for storing the package of data on each of a plurality of diskettes.

15. The system of claim 13, wherein said first transmitting means further comprises a computer network for downloading the package of data to a computer of a consumer.

16. The system of claim 13, further comprising:

means for counting, in the first computer, the number of times a consumer has redeemed a particular virtual coupon, and fraud indication means for indicating fraud if the number of times a virtual coupon is redeemed by the consumer exceeds a predetermined amount.

17. The system 16, wherein the consumer identification number is imprinted on a coupon generated from a corresponding virtual coupon, as a bar code, said system further comprises:

a scanning device for reading the consumer identification number bar code from the coupon, and output means for outputting the read consumer identification number to the database in the first computer.

18. The system of claim 17, wherein said processing means retrieves virtual coupon redemption data from the package of virtual coupon data.

19. The system of claim 18, further comprising:

second generating means, in the first computer, for generating in response to information retrieved form said processing means, and indication whether a consumer has redeemed a particular virtual coupon, revising the database to comprise at least a revised list of consumer names and addresses of who have redeemed said particular virtual coupon, and third generating means, in the first computer, for generating a revised package of data for a revised selected group of consumers from the revised list, the revised package of data including data for at least one virtual coupon, wherein said first transmitting means further transmits from the first computer the revised package of data to computers of the revised selected group of consumers from the list.

20. The system of claim 19, further comprising:

a comparator, in the first computer, for comparing the demographic and identification data received from a particular consumer with corresponding demographic and identification data from the list of consumer names and addresses; and fourth generating means for generating, in the first computer, a risk score based upon correspondence between demographic and identification data and received from said particular consumer with corresponding demographic and identification data from the list of consumer names and addresses, wherein said second transmitting means transmits a validation code to the computer of the consumer if the risk score is greater than a predetermined value.

* * * * *